United States Patent
Ng

(10) Patent No.: US 11,490,756 B2
(45) Date of Patent: Nov. 8, 2022

(54) PEELER

(71) Applicant: Wai Cheong Ng, Harlow (GB)

(72) Inventor: Wai Cheong Ng, Harlow (GB)

(*) Notice: Subject to any disclaimer, the term of this patent is extended or adjusted under 35 U.S.C. 154(b) by 256 days.

(21) Appl. No.: 16/768,013

(22) PCT Filed: Nov. 30, 2018

(86) PCT No.: PCT/GB2018/053480
§ 371 (c)(1),
(2) Date: May 28, 2020

(87) PCT Pub. No.: WO2019/106383
PCT Pub. Date: Jun. 6, 2019

(65) Prior Publication Data
US 2020/0359821 A1  Nov. 19, 2020

(30) Foreign Application Priority Data
Dec. 1, 2017 (GB) .................................... 1720081

(51) Int. Cl.
*A47J 17/02* (2006.01)
(52) U.S. Cl.
CPC .................................... *A47J 17/02* (2013.01)
(58) Field of Classification Search
CPC ........................................................ A47J 17/02
See application file for complete search history.

(56) References Cited

U.S. PATENT DOCUMENTS

| 5,325,593 A * | 7/1994 | Chen .................. A47J 17/02 30/304 |
| 5,613,431 A * | 3/1997 | Tateno ............... A47J 17/02 83/437.1 |
| 7,055,247 B2 * | 6/2006 | Kaposi ............... A47J 9/005 30/302 |
| 2012/0222312 A1 | 9/2012 | Bordas ....................... 30/123.6 |

FOREIGN PATENT DOCUMENTS

| CN | 201691652 | 1/2011 | ............ A47J 17/02 |
| CN | 202312781 | 7/2012 | ............ A47J 17/02 |
| CN | 204908999 | 12/2015 | ............ A47J 17/02 |
| CN | 206252275 | 6/2017 | ............ A47J 17/02 |
| DE | 299 10 161 | 9/1999 | ............ A47J 17/02 |
| DE | 20 2005 020 541 | 8/2006 | ............ A47J 17/02 |
| RO | 114546 | 6/1999 | ............ A47J 17/02 |
| WO | WO 2013/046203 | 4/2013 | ............ A47J 17/02 |

OTHER PUBLICATIONS

International Preliminary Report on Patentability issued in PCT/GB2018/053480, dated Jun. 2, 2020, 6 pages.
International Search Report and Written Opinion issued in PCT/GB2018/053480, dated Mar. 19, 2019, 9 pages.
Office Action issued Great Britain Patent Appln. Serial No. GB1819617.0, dated May 24, 2019, 6 pages.

* cited by examiner

*Primary Examiner* — Omar Flores Sanchez
(74) *Attorney, Agent, or Firm* — Hayes Soloway P.C.

(57) ABSTRACT

A peeler includes a handle, a blade mount a blade and an adjustment device, the blade mount and the blade forming a peeling gap, wherein the adjustment device is configured to adjust the tension of the blade in order to adjust the peeling gap. Preferably the peeler is configured to allow a user to adjust the peeling gap to a predetermined value selected by the user and to maintain the peeling gap at the predetermined value during normal use.

16 Claims, 28 Drawing Sheets

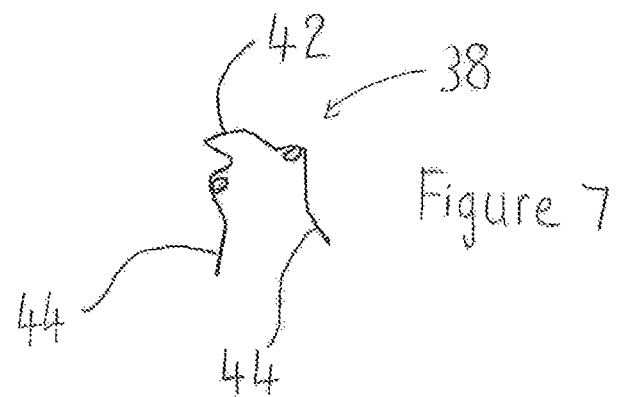
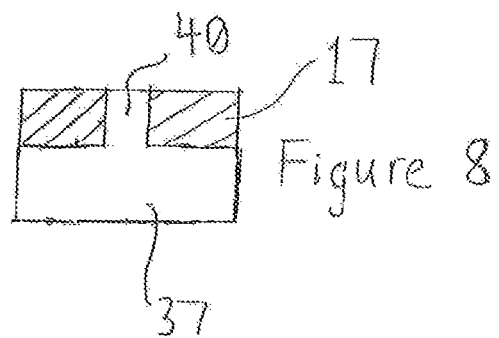
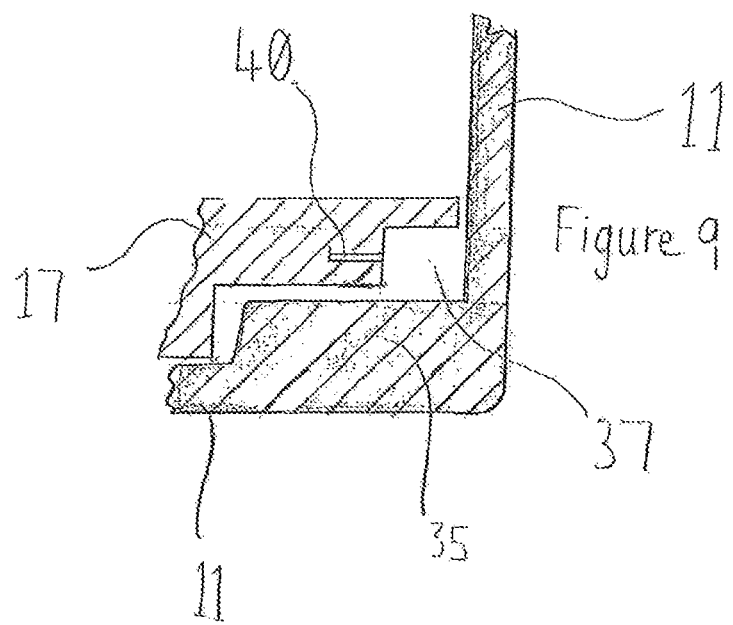

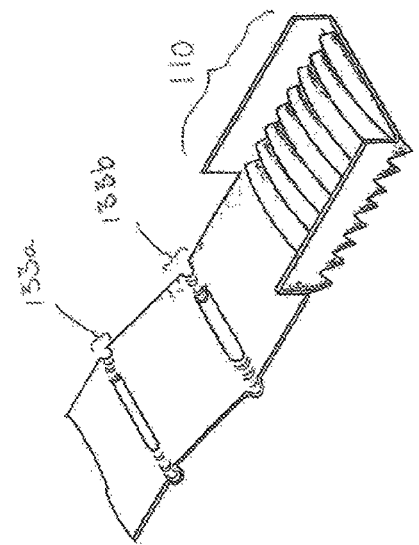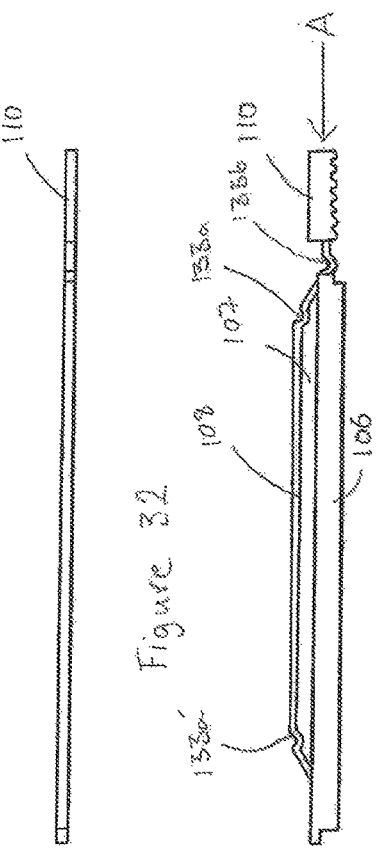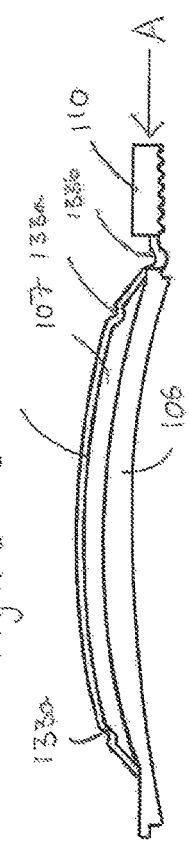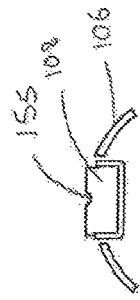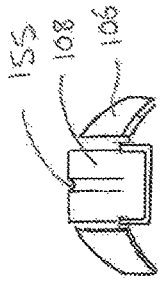

PEELER

The invention relates to a peeler suitable for peeling fruit, vegetables or other soft-material objects.

A peeler comprises a handle by which a user can hold the peeler and a peeling portion which can be brought into contact with the surface of an object to be peeled, such as a fruit or a vegetable. The peeling portion can be pressed against the outer surface of the object to cut into the object. By moving the peeler and the object relative to each other after cutting into the object, an outer layer of the object, such as a skin or rind, can be removed.

The invention aims to provide an improved peeler.

SUMMARY OF THE INVENTION

According to a first aspect of the invention, there is provided a peeler comprising: a handle, a blade mount and a blade, the blade mount and the blade forming a peeling gap, wherein the peeling gap is adjustable. Preferably the peeler further comprises an adjustment means, the adjustment means being configured to adjust the tension of the blade in order to adjust the peeling gap. Suitably the adjustment means allows the tension of the blade to be controlled by the user. Suitably the adjustment means allows the user to set the tension of the blade to a selected tension level in order to control the peeling gap so that the peeling gap can be set by the user.

Preferably the adjustment means is configured to allow a user to adjust the peeling gap to a predetermined value selected by the user and to maintain the peeling gap at said predetermined value during normal use. The peeler may further comprise retaining means for retaining the peeling gap at said predetermined value during normal use. For example, the retaining means may act to retain the peeling gap at said predetermined value unless sufficient force is imparted to part of the adjustment means in order to adjust the tension of the blade. In such embodiments, if the user imparts sufficient force to the adjust means, the tension of the blade may be adjusted. In some embodiments the peeler may be configured to provide a locked configuration in which the peeling gap is retained at a selected value and an adjustable configuration wherein the peeling gap can be adjusted.

In such embodiments the peeler preferably includes means for converting between the locked configuration and the adjustable configuration. The term "normal use" of the peeler as referred to herein refers to use of the peeler in peeling.

The adjustment means may be configured such that the user may adjust the peeling gap to a predetermined value from a continuous range or to predetermined value from a discrete set of possible values.

In preferred embodiments the width (w) of the peeling gap is adjustable. Preferably the adjustment means includes a dial rotatable with respect to the handle to cause adjustment of the peeling gap. In preferred embodiments the dial is configured to control the tension of the blade in order to adjust the peeling gap. The adjustment means may include mutually engaging members arranged to convert rotational motion of a first component of the adjustment means into linear motion of a second component of the adjustment means. In this way rotational motion of the dial may be converted into linear motion of an end of the blade in order to vary the tension of the blade. The mutually engaging members of the adjustment means may be screw threads. For example, the adjustment means may include a lead screw mechanism. Alternatively the mutually engaging members may comprise a rack and pinion mechanism. Preferably the blade is moveable relative to the blade mount, via tensioning of the blade, to facilitate adjustment of the peeling gap.

Preferably the blade includes at least one radiused part arranged to facilitate adjustment of the peeling gap. Said at least one radiused part may comprise a curved corner, a kink or the like. Preferably the blade comprises a cutting edge, the blade comprising a first radiused part at one end of the cutting edge and a second radiused part at the other end of the cutting edge.

Preferably the blade is curved along a portion of its length. In some embodiments the blade and blade mount may be curved. In certain embodiments the blade is curved such that the cutting edge of the blade is curved.

According to a second aspect of the invention, there is provided a peeler comprising: a handle, a blade mount and a blade, the blade mount and the blade forming a peeling gap, wherein the blade is convexly curved along a substantial portion of the length of the blade.

DESCRIPTION OF THE DRAWINGS

Specific embodiments of the invention will now be described by way of non-limiting examples, in which:

FIG. 7 illustrates a centring spring which can be used in a peeler, in pictorial view;

FIG. 8 illustrates a portion of a peeler, in cross section;

FIG. 9 illustrates a portion of a peeler in cross section;

FIGS. 27 to 53 illustrate an alternative embodiment of a "Y" shaped peeler;

FIG. 27 illustrates a perspective view of the "Y" shaped peeler;

FIG. 28 illustrates a side view of a radiused part of the peeler comprising one micro-radius before being machined into its final geometry;

FIG. 29 illustrates a plan view a radiused part of the peeler comprising a plurality of micro-radii before being machined into its final geometry;

FIG. 30 illustrates a plan view a radiused part of the peeler comprising a plurality of micro-radii after being machined into its final geometry;

FIG. 31 illustrates a plan view of the blade mount and blade before being machined into its final geometry;

FIG. 32 illustrates a side view of FIG. 31 before being machined into its final geometry;

FIG. 33 illustrates a side view of a straight blade and blade mount after being machined into its final geometry;

FIG. 34 illustrates a side view of a curved blade and blade mount after being machined into its final geometry;

FIG. 35 illustrates end view of FIG. 33 looking in the direction labelled A in FIG. 33;

FIG. 36 illustrates end view of FIG. 34 looking in the direction labelled A in FIG. 34;

FIG. 37 illustrates a blade driver of the peeler;

FIG. 38 illustrates an enlarged view of FIG. 37;

FIG. 39 illustrates a partial axial cross-section across the plane XA of FIG. 27 showing the adjustment means of the peeler;

FIG. 40 illustrates an axial cross-section along the plane A of FIG. 39;

FIG. 41 illustrates an exploded view of the adjustment lever, threaded neck and ring;

FIG. 42 illustrates a side view of the adjustment means;

FIG. 43 illustrates the locking pin, centre pin and square pin of the adjustment means;

FIG. 44 illustrates a plan view of the housing before being machined into its final geometry;

FIG. 45 illustrates a front view of the rotatable dial and housing;

FIG. 46 illustrates the adjustment means of FIG. 42 without the adjustment lever;

FIG. 47 illustrates the end plate of the peeler;

FIG. 48 illustrates a cross-sectional view of the swivel means;

FIG. 49 illustrates a front view of the handle of the peeler;

FIG. 50 illustrates a peeler showing the clasping members of the handle;

FIG. 51 illustrates the swivel body and swivel pin of the swivel means;

FIG. 52 illustrates perspective view of the supporting member; and

FIG. 53 illustrates a perspective view of the swivel mounting portion of the swivel means.

DESCRIPTION OF THE INVENTION

In this document, the words "include", "comprise" and their derivatives are intended to have a non-exhaustive meaning. Therefore, "an x comprising a y" or "an x including a y" is intended, in this document, to mean that the x includes at least a y and that the x may include additional components. The words "only" or "compose" and its derivatives will be used where an exhaustive meaning is intended. For example, "the x is composed of a y and a z" is intended to mean that the x includes only a y and a z (and no other components).

The word "connected" is intended to include both direct and indirect connection or coupling between objects. For example, "the m is connected to the n" is intended to include the possibilities that the m is directly connected to the n (i.e. with no intervening components) or indirectly connected to the n (i.e. with one or more intervening components). Where direct connection between two components is intended (i.e. connection with no intervening components), the words "direct connection" will be used.

The present embodiments represent the best ways currently known to the applicant of putting the invention into practice, but they are not the only ways in which this can be achieved. They are illustrated, and they will now be described, by way of example only.

Figure 1:
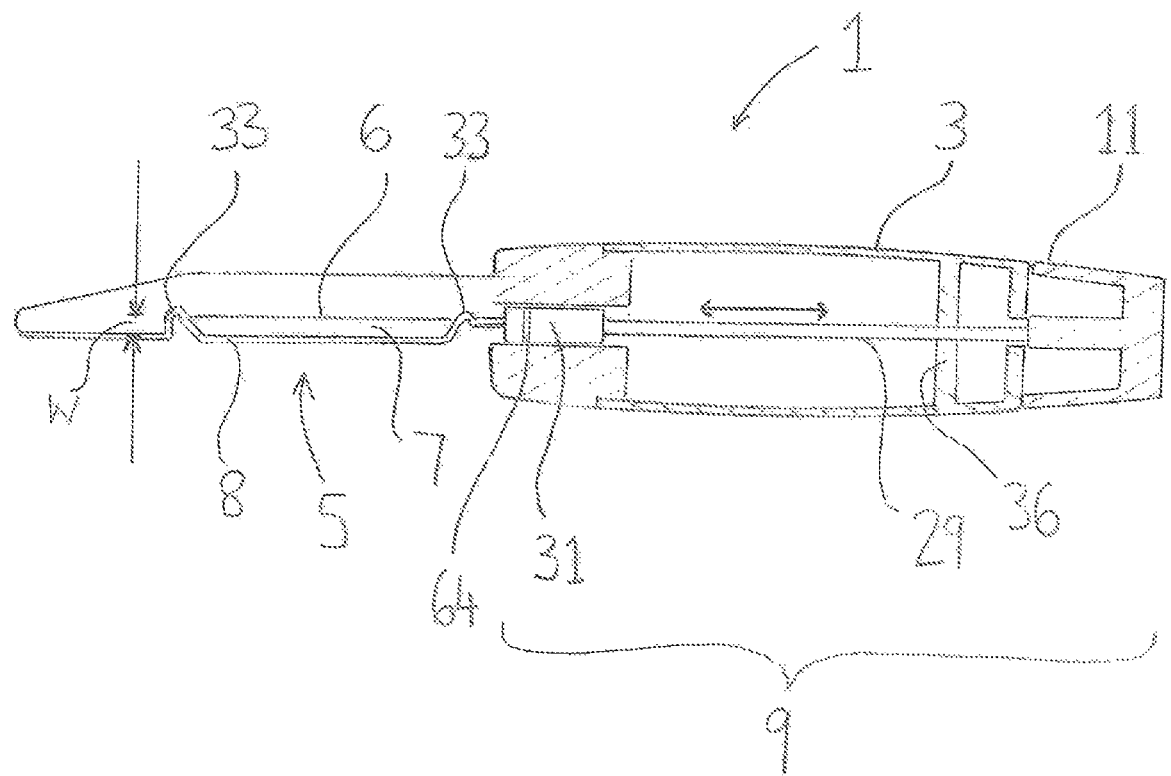
FIG. 1 illustrates a peeler in partial axial cross section, along the length of the peeler, the peeler including a substantially straight handle and a blade which is straight along a substantial portion of the length of the blade.

In FIG. 1 there is illustrated a peeler 1 including a handle 3 and a peeling portion 5. The peeling portion 5 comprises a blade mount 6 and a blade 8 connected to the blade mount 6 at least one end (e.g. the left-hand end in FIG. 1). The blade 8 may be axially immovably connected to the blade mount 6 at one end. The blade 8 may be axially movably connected to the blade mount 6 at or towards another end of the blade 8. The blade mount 6 and the blade 8 together form a peeling gap 7, i.e. a gap between the blade mount 6 and the blade 8 through which a portion of an object to be peeled may pass.

To peel an object, a user of the peeler 1 first brings the blade 8 into contact with an object to be peeled and applies a force to the peeler 1 such that the blade 8 cuts into the object, to a depth corresponding approximately to the width w of the peeling gap 7. The blade 8 is prevented from cutting more deeply into the object when the blade mount 6 meets the surface of the object.

The user then moves the peeler 1 across the surface of the object. The action of the blade 8 passing underneath the outer surface of the object separates the outer surface from the rest of the object. The separated layer (peel) passes through the peeling gap 7 as the user moves the peeler 1 along the surface of the object. The user can therefore remove an outer layer of the object, leaving a peeled object. The removed layer can be used or disposed of as appropriate.

The peeling gap 7 of the peeler 1 illustrated in FIG. 1 is adjustable, as will be described in more detail below. Advantageously, an adjustable peeling gap 7 may allow a user of the peeler 1 to specify how deeply into the object the blade 8 will cut before the blade mount 6 contacts the object, and/or how wide a strip of peel the blade 8 will cut with one motion.

As a consequence, the user can specify the thickness and/or width of the layer that will be removed from the object that is to be peeled by the peeler 1. This may enable the user of the peeler 1 to minimise the volume of the object that is removed unnecessarily by the peeler 1, thereby reducing wasted volume of the object to be peeled. Furthermore, for many fruits and vegetables, valuable nutrients are contained at or near the surface. The user of the peeler 1 can therefore retain more of the valuable nutrients by adjusting the peeling gap 7 to match as closely as possible the thickness of only the outermost layer.

For example, if the object to be peeled is a potato or a carrot, a user may only wish to remove a relatively thin skin from the object (e.g. a skin of thickness between 0.1 mm and 2 mm). The peeler 1, with its adjustable peeling gap 7, enables the user to set the peeling gap 7 accordingly. If the object to be peeled is a pumpkin or a pineapple, the user may wish to remove a comparatively thick skin from the object (e.g. a skin of thickness between 2 mm and 3 mm or higher). The peeler 1, with its adjustable peeling gap 7, enables the user to set the peeling gap 7 accordingly.

The peeler 1 includes adjustment means 9 which are arranged to adjust the width w of the peeling gap 7. In the illustrated example, the adjustment means 9 comprise a rotatable dial 11 provided on the handle 3 at the opposite end of the peeler 1 from the peeling portion 5. The dial 11 is rotatable about a longitudinal axis of the peeler 1. As will be explained with reference to FIGS. 4 and 5, rotation of the rotatable dial 11 by a user of the peeler 1 is converted into linear motion of a connector 29 that connects the rotatable dial 11 and the blade 8 in the peeling portion 5 of the peeler 1. The linear position of the connector 29 affects the tension in the blade 8. This results in the blade 8 being held closer to or further away from the blade mount 6, depending on the direction of linear motion of the connector 29. In the illustrated example, the direction of linear motion of the connector 29 is dependent upon the direction of rotation of the rotatable dial 11. Rotating the rotatable dial 11 in one direction around the longitudinal axis of the peeler 1 results in increased tension being applied to connector 29, such that the connector 29 is drawn to the right in FIG. 1, in a direction parallel to the double-headed arrow illustrated in FIG. 1. As a consequence, the blade 8 is drawn closer to the blade mount 6, resulting in a narrowing of the adjustable peeling gap 7 (i.e. a reduction of the width w of the peeling gap 7). Rotating the rotatable dial 11 in the opposite direction around the longitudinal axis of the peeler 1 results in decreased tension being applied to connector 29, such that the connector 29 is allowed to move to the left in FIG. 1, in a direction parallel to the double-headed arrow illustrated in FIG. 1. As a consequence, the blade 8 is allowed to move further away from the blade mount 6, resulting in a widening of the adjustable peeling gap 7 (i.e. an increased of the width w of the peeling gap 7).

The illustrated blade 8 includes radiused parts 33, which may also be referred to as radiused or curved corners 33. The radiused parts 33 help to ensure that the blade 8 is kept at least a small width away from the blade mount 6, even when tension applied to the connector 29 is high and the blade 8 is drawn in closer to the blade mount 6. The shape of the radiused parts 33 may also help facilitate or encourage a drawing of the blade 8 towards the blade mount 6 when the tension in the connector 29 is increased, e.g. by allowing a flexing and/or straightening of the blade 8 in the vicinity of the radiused parts 33 in a relatively controlled way. The radiused parts 33 may therefore assist the maintenance and adjustment of the peeling gap 7.

The connector 29 is connected to the blade 8 via a joint 31. The illustrated joint 31 is a component to which one end of the blade 8 is connected and to which one end of the connector 29 is connected. The joint 31 may provide some angular tolerance for the blade 8 and/or the connector 29 such that the longitudinal axes of the blade 8 and the connector 29 in the vicinity of the connector 29 can be out of alignment with one another and/or so that the angle between the blade 8 and the connector 29 can vary. The illustrated joint 31 serves as a seal between the movement of the connector 29 inside the handle 3 and the blade 8 outside the handle 3, whereby it permits linear movement to be exerted on the blade 8 by the connector 29.

In other embodiments, the connector 29 and the blade 8 may be formed of a continuous component. In such embodiments, the blade 8/connector 29 component may pass over or through a tensioning component which may help to accommodate a change in direction of the blade 8/connector 29 component along the length of the peeler 1. For example, the connector 29 may in some embodiments be at an angle to the longitudinal axis of the peeler 1, while the blade 8 may extend substantially parallel to the longitudinal axis of the peeler 1. In embodiments in which the blade 8 and connector 29 are a single component, such a difference in angle may be accommodated by the component passing over or around one or more tensioning or positioning elements, such as a peg or other feature with a rounded surface which the component can contact and curve around such that the blade 8/connector 29 component extends in a straight line to the right of the right-hand curved corner 33 illustrated in FIG. 1.

Figure 2:
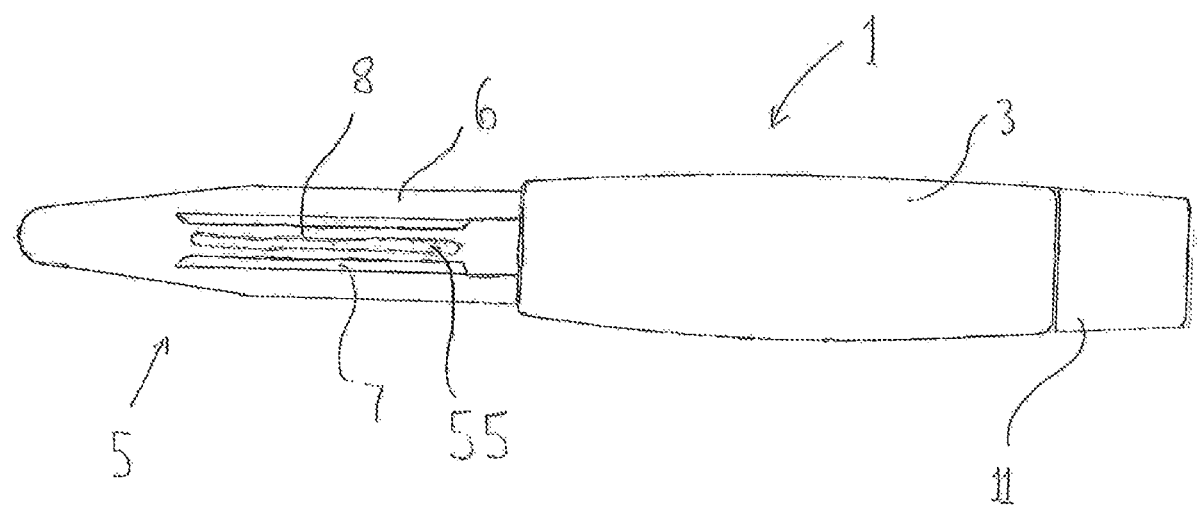
FIG. 2 illustrates a peeler in plan view.

FIG. 2 illustrates the peeler 1 of FIG. 1 in plan view, with the blade 8 visible on top at the peeling-portion 5 end of the peeler 1. As shown in FIG. 1, the blade 8 is raised relative to the blade mount 6. The blade mount 6 and the blade 8 therefore define the peeling gap 7 through which an outer layer of an object can pass when the peeler 1 is used to peel the outer layer from the object.

Figure 3:
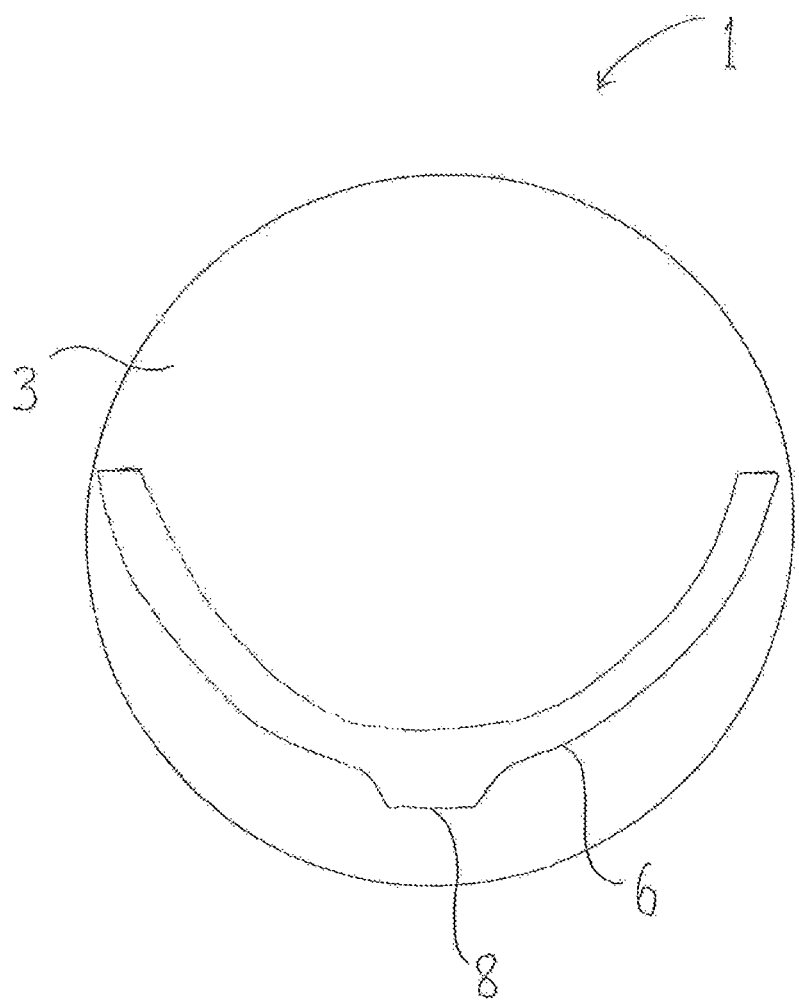
FIG. 3 illustrates a peeler in front end view.

FIG. 3 illustrates the peeler 1 in front end view, i.e. looking along the longitudinal axis of the peeler 1 with the peeling-portion 5 end of the peeler 1 closest to the viewer and the handle 3 end furthest away from the viewer. The blade mount 6 of peeling portion 5 is substantially radially curved, approximately forming an arc, with blade 8 protruding away from the blade mount 6 to form the peeling gap 7 (blade 8 protruding down from blade mount 6, as drawn in FIG. 3, the protrusion being formed in part by the radiused parts 33). In the illustrated embodiment, the main length of the blade 8 is parallel to the blade mount 6 such that the adjustable peeling gap 7 is substantially uniform in width w along its length.

Figure 4:
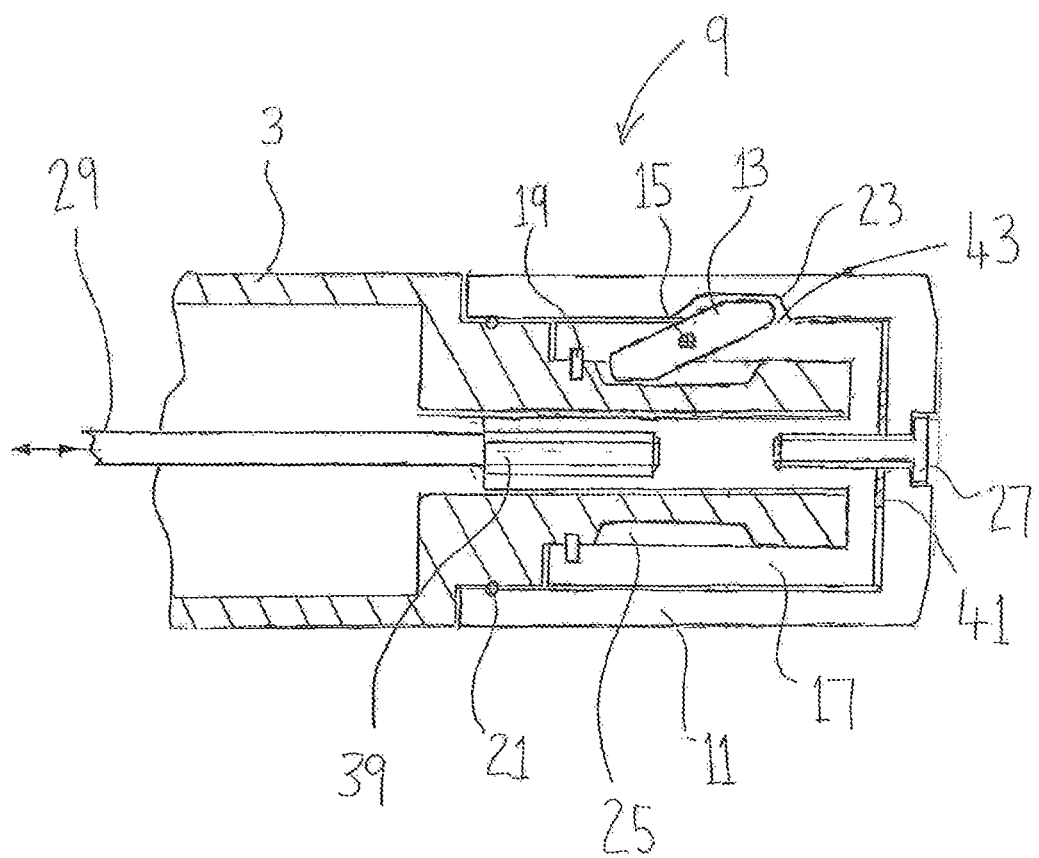
FIG. 4 illustrates an end portion of a peeler, in axial cross section along the length of the end portion of the peeler.
Figure 5:
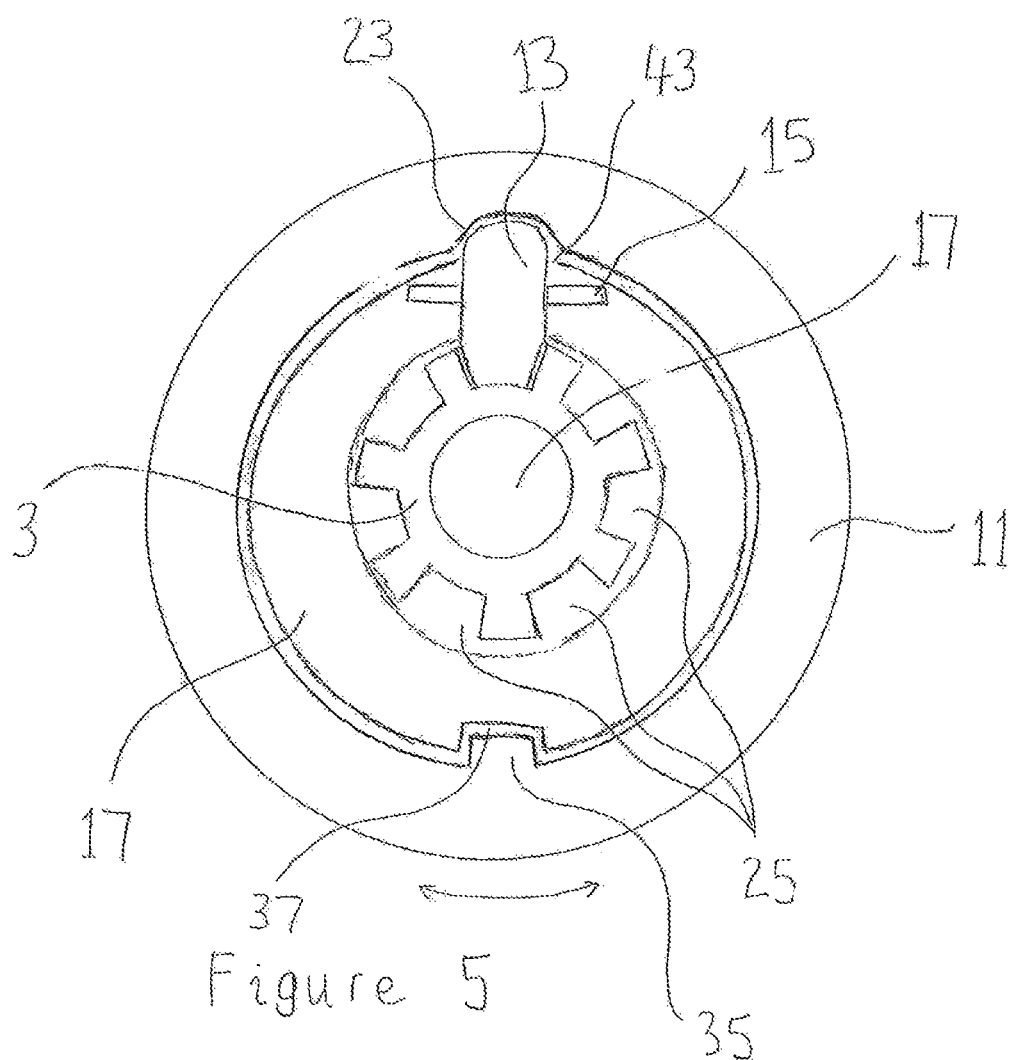
FIG. 5 illustrates an end portion of a peeler, in radial cross section across the diameter of the peeler.

FIGS. 4 and 5 illustrate components of the adjustment means 9 of the peeler 1 of FIGS. 1 to 3, the adjustment means 9 being substantially located towards an end of the peeler 1 in the illustrated embodiment. FIGS. 4 and 5 show the components in axial and radial cross section, respectively. The rotatable dial 11 is the radially outermost component, such that a user of the peeler 1 can contact the rotatable dial 11 and rotate it about the longitudinal axis of the peeler 1. The dial 11 includes a recess 23 on its inner circumference. The recess 23 is sized and shaped to receive one end of a pivotable lever or catch 13 (the radially outermost end of the pivotable lever 13 in FIG. 1) which holds the rotatable dial 11 rotationally in place relative to the handle 3 of the peeler 1. The lever 13 is pivotably mounted on a pin 15, which in turn is mounted on or in an inner sleeve 17 (see detailed illustration of inner sleeve 17 shown in FIG. 10, in which an aperture 45 is provided in the inner sleeve 17 to receive the pin 15). The inner sleeve 17 is arranged for rotation about the longitudinal axis of the peeler 1. The other end of the lever 13 (the radially innermost end in FIG. 4) is sized and shaped to fit into any of a plurality of recesses 25 in handle 3 (see FIG. 5).

In order to adjust the peeling gap 7, the user of the peeler 1 rotates the rotatable dial 11 relative to the handle 3 about the longitudinal axis of the peeler 1. The act of rotating the dial 11 causes the thicker portion of the rotatable dial 11 circumferentially next to the recess 23 to push the radially outermost end of the lever or catch 13 radially inwards. The lever or catch 13 is caused to pivot sufficiently far about the pin 15 that the radially innermost end of the lever or catch 13 lifts out of the recess 25 and can pass over the "spline" feature on the handle 3 that demarcates the boundary between the recess 25 that the radially innermost end of the lever or catch 13 had occupied and the neighbouring recess 25. This allows the rotatable dial 11 to be rotated relative to the handle 3 about the longitudinal axis of the peeler 1, but only when a rotational force sufficiently large to cause the lever or catch 13 to pivot about the pin 15 out of the currently occupied recess 25 is applied to the rotatable dial 11. The lever 13/pin 15/recess 25 arrangement therefore minimises the likelihood of inadvertent rotation of rotatable dial 11, by requiring a minimum turning force to be applied to the dial 11.

One or more protrusions 35 on the inner circumference of rotatable dial 11 are positioned within one or more corresponding recesses 37 in the outer circumference of the inner sleeve 17 (see FIG. 5). As will be explained in more detail below with reference to FIG. 6, when the rotatable dial 11 rotates about the longitudinal axis of the peeler 1 beyond a certain angle, the inner sleeve 17 is also caused to rotate. The end of the connector 29 nearest the rotatable dial 11 is connected to the inner sleeve 17 at 39 by means of mutually engaging screw threads or another suitable mechanism. The mutually engaging screw threads or other suitable mechanism convert rotational motion of the inner sleeve 17 about the longitudinal axis of the peeler 1 into linear motion of the connector 29. The handedness of the screw threads (left-handed or right-handed) affects which direction of linear motion the rotational motion is converted into. The linear motion of the connector 29 impacts the size of the peeling gap 7 by causing the blade 8 to be drawn closer to the blade mount 6 or to move away from the blade mount 6, depending on the direction of rotation of the rotatable dial 11. Relative axial movement of the handle 3 and the inner sleeve 17 is constrained by a circlip 19 which fits into corresponding recesses in the interior of the handle 3 and the inner sleeve 17 (see FIG. 4).

An O-ring 21 is provided between the handle 3 and the rotatable dial 11 to minimise the likelihood of ingress of substances into the interior of the adjustment means 9.

A screw 27 is provided at the end of the peeler 1 opposite the peeling portion 5 (i.e. at the right-hand end in FIGS. 1, 2 and 4) to constrain axial movement of the rotatable dial 11 relative to the handle 3. In the illustrated embodiment, a spacer 41 is provided between the rotatable dial 11 and the inner sleeve 17, coaxially with the screw 27, to minimise friction between the dial 11 and the sleeve 17. The spacer 41 may for example be made of or include a low-friction polytetrafluoroethylene material (such as Teflon®) or another suitable material. Further spacers may be provided in specific locations.

Figure 6:
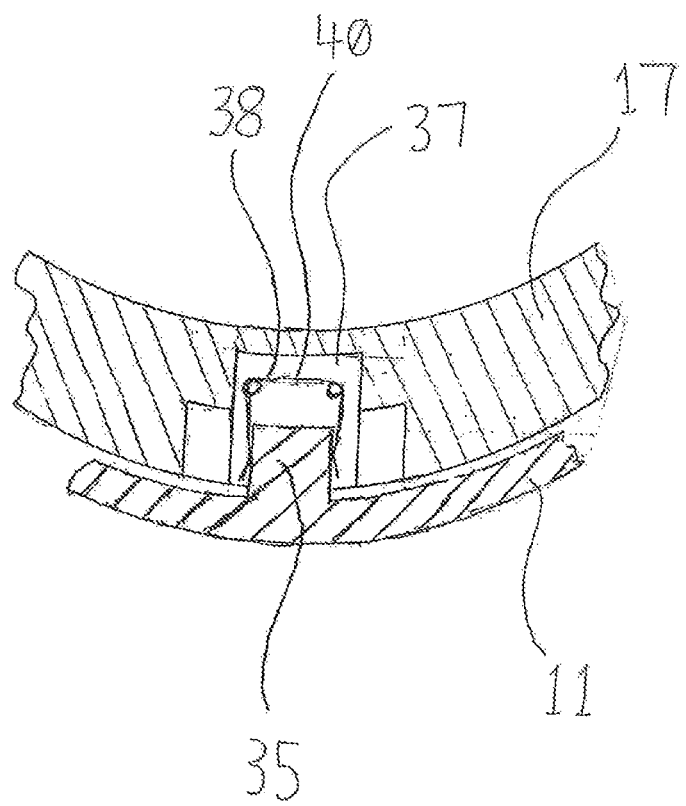
FIG. 6 illustrates part of a peeler, in radial cross section.

FIG. 6 is an expanded view of the protrusion 35 from the inner circumference of rotatable dial 11 and the recess 37 in the inner sleeve 17 into which the protrusion 35 protrudes.

In the illustrated embodiment, a centring spring 38 is provided in the recess 37 of the inner sleeve 17. The centring spring 38 acts on protrusion 35 protruding from the inner circumference of the rotatable dial 11 to centre the protrusion 35 within the recess 37. This may help ensure that the rotatable dial 11 defaults to a specific position relative to the handle 3 after the rotatable dial 11 has been rotated. The peeler 1 may include markings on the exterior of the handle 3 and the rotatable dial 11 to indicate that the rotatable dial 11 is in a particular position (e.g. of a set of possible positions). The markings may indicate particular dimensions of peeling gap 7, because the position of the rotatable dial 11 relative to the handle 3 determines a linear position of the connector 29, which controls adjustment of the adjustable peeling gap 7. For example, a specific marking on the exterior of the handle 3 may indicate that the rotatable dial 11 is in a position corresponding to a peeling gap width w of 1 mm. Another marking on the exterior of the handle 3 may indicate that the rotatable dial 11 is in a position corresponding to a peeling gap width w of 2 mm. There may be further markings corresponding to smaller, larger or intermediate peeling gap widths w, depending on the specific configuration of the peeler 1. The centring spring 38 may help to ensure that a marking on the rotatable dial 11 always correctly aligns with a marking on the handle 3.

As illustrated in FIG. 7, the centring spring 38 of the illustrated embodiment includes an approximately square protruding portion 42 and biased arms 44. In the illustrated embodiment, the protruding portion 42 and the biased arms 44 are at an angle of approximately 90° to each other, but in other embodiments they may be at a different angle to each other. The protruding portion 42 of the spring is insertable into a recess 40 provided in inner sleeve 17. Recess 40 in inner sleeve 17 is illustrated end-on in FIG. 6, in axial cross-sectional view in FIG. 8, and in side view in FIG. 9. Once the protruding portion 42 has been inserted into the recess 40, the spring 38 is rotationally fixed relative to the inner sleeve 17. The biased arms 44 then act upon the protrusion 35 protruding from the inner circumference of the rotatable dial 11 to bias the protrusion 35 into a specific position (e.g. a central position) within the recess 37. This has the effect of controlling the alignment of the rotatable dial 11 with the handle 3.

Figure 10:
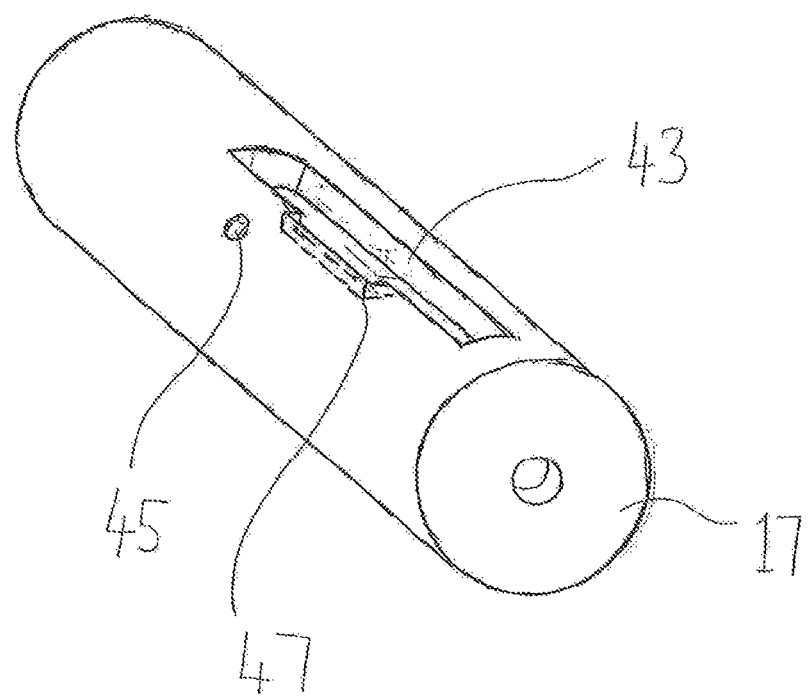
FIG. 10 illustrates an inner sleeve forming part of a peeler.

Several features of the inner sleeve 17 of previous figures are illustrated in FIG. 10. The inner sleeve 17 includes an aperture 43 through which the pivotable lever or catch 13 can protrude to engage with a recess 23 in the inner circumference of the rotatable dial 11. The inner sleeve 17 also includes an aperture 45 arranged to receive the pin 15 about which the pivotable lever or catch 13 rotates. A slot 47 is provided in the inner sleeve 17, at the opening of aperture 43 in the illustrated embodiment. As will be explained in more detail below, the slot 47 is suitable for receiving part of a spring 49 that acts to urge the pivotable lever or catch 13 into the position illustrated in FIG. 4.

Figure 11:
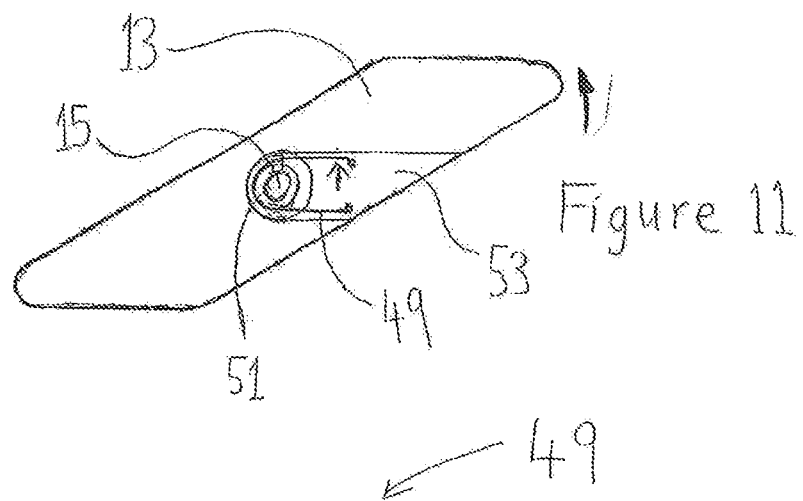
FIG. 11 illustrates a pivotable lever or catch forming part of a peeler.
Figure 12:
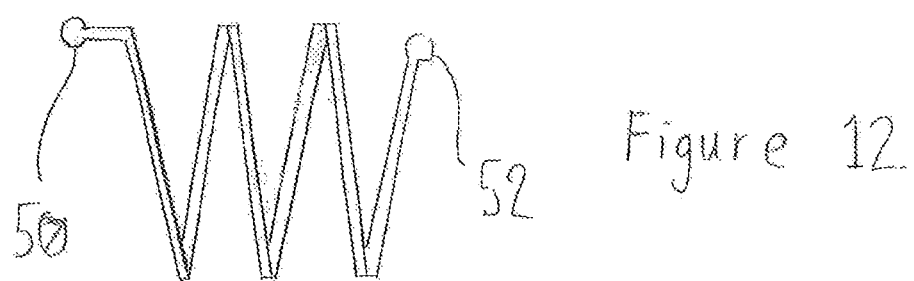
FIG. 12 illustrates a spring forming part of a peeler.
Figure 13:
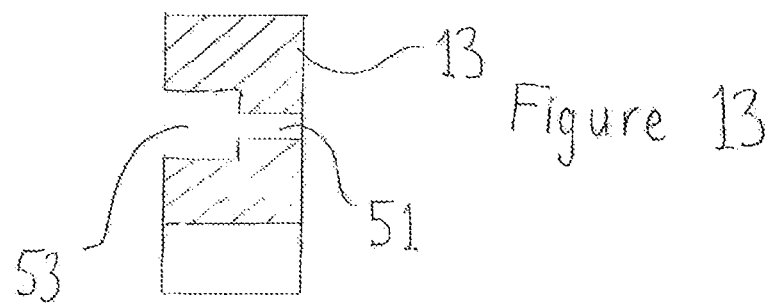
FIG. 13 illustrates a portion of a peeler, in cross-sectional plan view.

Spring 49 is illustrated in FIGS. 11 and 12. The spring 49 acts to bias the pivotable lever or catch 13 such that the lever or catch 13 tends to the position illustrated in FIG. 4, i.e. such that the lever or catch 13 tends to rotate about pin 15 in the direction indicated by the arrows in FIG. 11. The spring 49 includes a first end 50 which contacts the inner sleeve 17 in the slot 47 provided in the inner sleeve 17 and a second end 52 which contacts the lever or catch 13 in an aperture 53 provided in a side of the lever or catch 13. As illustrated in FIG. 13, the aperture 53 narrows to passage 51, through which the pin 15 passes, as illustrated in FIG. 11.

The force of the spring 49 can be overcome by rotating the rotatable dial 11 about the longitudinal axis of the peeler 1, such that the edge of recess 23 comes into contact with the lever or catch 13, applying a force to the lever or catch 13 which causes the lever or catch 13 to rotate about the pin 15 sufficiently far that the opposite end of the lever or catch 13 is lifted clear of the splines defining the recess 25 in which the lever or catch 13 had been positioned. The lever or catch 13 may therefore rotate such that it extends substantially parallel to the longitudinal axis of the peeler 1, rather than at an angle to the longitudinal axis as illustrated in FIG. 11. The tolerance provided by the relative widths of protrusion 35 and recess 37 and the centring spring 38 allows the rotatable dial 11 to rotate sufficiently far for the lever or catch 13 to lift before the inner sleeve 17 begins to rotate with the rotatable dial 11.

Once the lever or catch 13 has passed the spline demarcating the boundary between neighbouring recesses 25, the action of the spring 49 causes the lever or catch 13 to rotate in the direction indicated in FIG. 11 such that the lever or catch 13 engages at its radially innermost end with the next recess 25 around from its previous position, preventing the rotatable dial 11 from rotating further without further application of force by a user of the peeler 1. The centring spring 38 will cause the inner sleeve 17 to settle into a centred position relative to the rotatable dial 11. This process can be repeated until the adjustable peeling gap 7 has the desired width w or other property.

Figure 14:
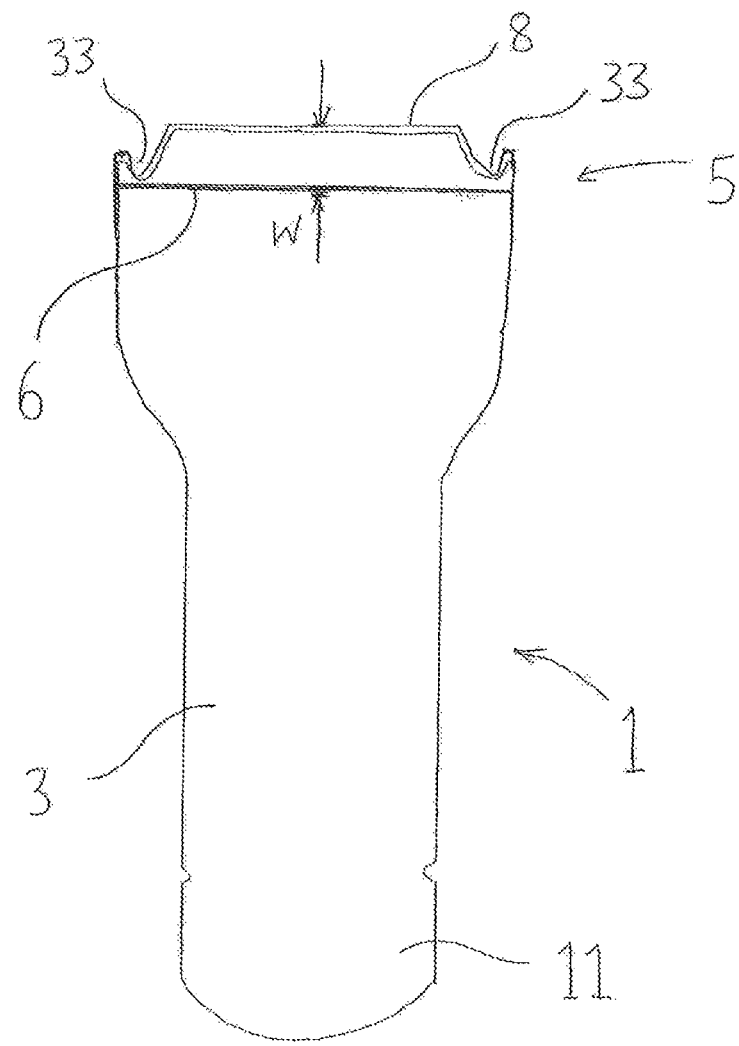
FIG. 14 schematically illustrates a peeler, the peeler including a substantially Y-shaped handle and a blade which is straight along a substantial portion of the length of the blade.

An adjustable peeling gap 7 can be implemented in other shapes or arrangements of peeler 1, such as the alternative shape of peeler 1 illustrated in FIG. 14. The peeler 1 illustrated in FIG. 14 has a substantially "Y"-shaped handle 3 and an adjustable peeling gap 7 defined by a blade mount 6 and a blade 8. The peeler 1 has a rotatable dial 11 at the opposite end of the peeler 1 from the peeling portion 5, analogously to the peeler 1 illustrated in FIGS. 1, 2 and 3, and may incorporate some or all of the same adjustment means 9 as the peeler 1 illustrated in FIGS. 1, 2 and 3, such as the mechanism or components illustrated in FIGS. 4 to 13, with appropriate adjustments made to the mechanism to account for the different geometry of the peeler 1 illustrated in FIG. 14. For example, an adjustment unit may be mounted at one or both ends of the blade to effect adjustment of the adjustable peeling gap. The adjustment unit may be small (e.g. shirt-button sized) and/or may be included in an end cap via which the blade is mounted on the Y-shaped handle (e.g. an end cap which allows the blade to pivot about its longitudinal axis, relative to the handle). A slider or rotational screw thread may be provided to exert force on the blade and effect adjustment the adjustable peeling gap. The same or similar components may also be implemented in other shapes or arrangements of peeler, with appropriate adjustments to account for the different geometry.

Figure 15:
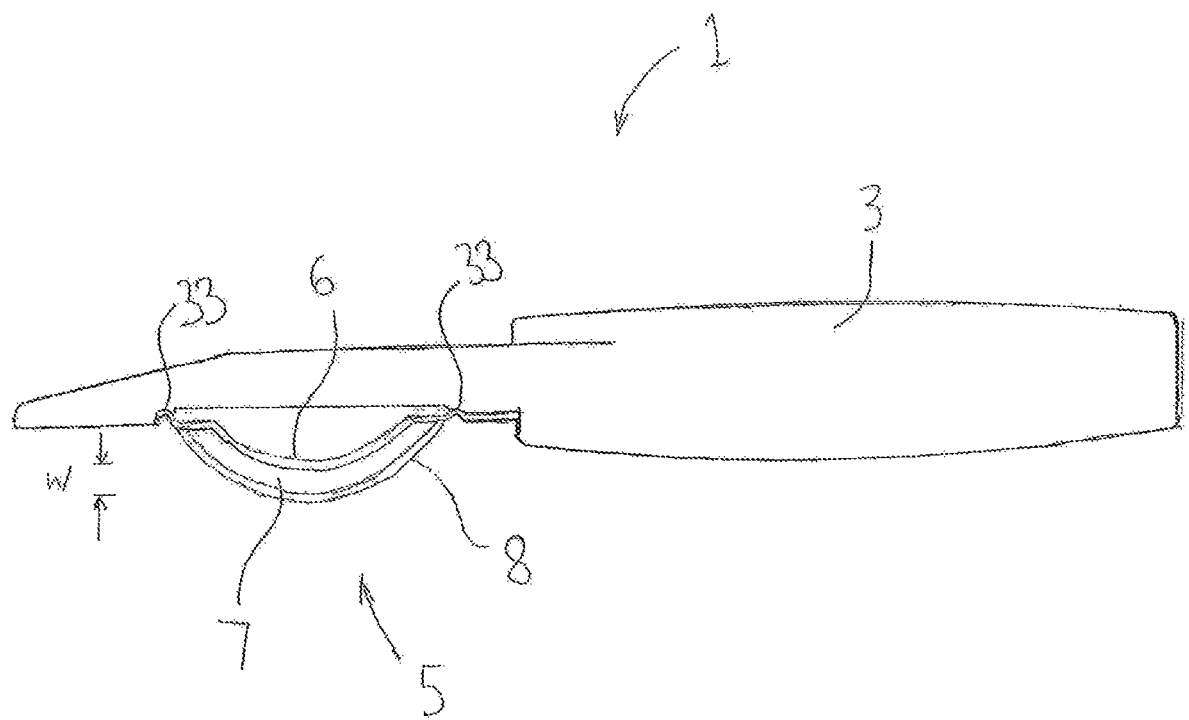
FIG. 15 illustrates a peeler in partial axial cross section, along the length of the peeler, the peeler including a substantially straight handle and blade which is curved along a substantial portion of the length of the blade.

FIG. 15 illustrates in partial axial cross section a peeler 1 including a handle 3 and a peeling portion 5, the peeling portion 5 including a blade mount 6 and a blade 8, the blade mount 6 and the blade 8 together defining a peeling gap 7. In the illustrated embodiment, the blade 8 is curved along substantially its entire length, although in other embodiments the blade 8 may be curved along less of its length than this. A blade 8 may be curved along a substantial portion of its length, e.g. along between 10% and 100% of its length, or more particularly between 25% and 100% of its length. The blade 8 is curved such that a cutting edge of the blade 8 is curved.

The illustrated blade mount 6 is also curved such that the blade mount 6 and the blade 8 form a peeling gap 7 that is curved and whose width w is substantially constant along the length of the peeling gap 7. Material that is peeled from the surface of an object using the peeler 1 of FIG. 15 is therefore of substantially uniform thickness along the cutting length of the peeler 1. The curve of the blade 8 is a convex curve. The arc of the curve of the blade 8 projects outwards, away from the longitudinal axis of the peeler 1, whereas a concavely curved blade would have its arc projecting inwards, towards and/or across the longitudinal axis of the peeler 1.

The curve of the blade 8 of the peeler 1 illustrated in FIG. 15 may advantageously make it easier to peel a larger object (such as a pumpkin or a pineapple). It may make it easier for a user, in particular a user with restricted hand movement, to peel the object, since it may require less force for a user to peel a narrower strip of outer surface from an object using a peeler with a curved blade than a wider strip of outer surface using a peeler with a straight blade. A peeler with a straight blade may encounter more resistance from the pineapple peel than a curved blade. Even with a new, sharp straight blade, it may take several passes to achieve a satisfactory result. It may be easier to achieve the satisfactory result using a peeler with a curved blade. A curved blade may be able to cut to a greater depth with less effort. Using a peeler with a curved blade may also be preferable to and/or safer than using a large and/or sharp knife for peeling larger objects (such as a pumpkin or a pineapple).

In some embodiments, it may be preferred for the blade mount 6 to be straight and for the blade 8 to be curved, such that the peeling gap 7 is approximately semi-circular. The blade mount 6 and the blade 8 will be formed during manufacture into the desired arrangements for the specific embodiment, e.g. such that the curvature of the blade mount 6 matches the curvature of the blade 8.

In the illustrated embodiment, the curvature of the blade 8 is substantially constant along the length of the blade 8. The radius of curvature of the blade 8 is substantially constant along the length of the blade 8. In other embodiments, the curvature of the blade 8 may vary along the length of the blade 8, to give the user multiple different cutting properties at different parts of the blade 8. For example, near where the blade 8 is affixed to the blade mount 6 or another component of the peeler 1, the blade 8 may have a gentle curve (a large radius of curvature), and at the centre of the blade 8 (farthest from the blade mount 6) the blade 8 may have more of a curve (a smaller radius of curvature).

Figure 16:
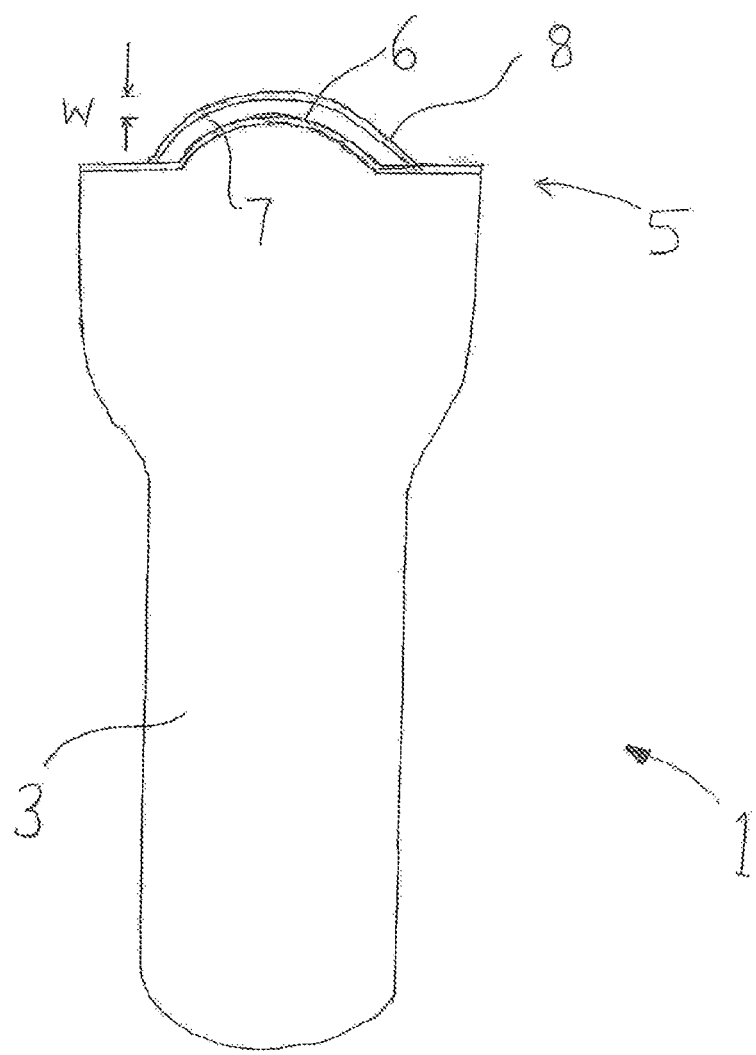
FIG. 16 schematically illustrates a peeler, the peeler including a substantially Y-shaped handle and blade which is curved along a substantial portion of the length of the blade.

Another example of a peeler 1 with a curved blade 8 is schematically illustrated in FIG. 16. A curved blade 8 could also be implemented with other shapes or configurations of peeler 1, with appropriate adjustments made for the geometry of the peeler 1.

In some embodiments, a peeler 1 may have both an adjustable peeling gap 7 and a blade 8 which is curved along substantially its entire length. For example, a curved blade 8 such as that illustrated in FIG. 15 or 16 may be provided on a peeler 1 as illustrated in FIG. 1, 2 or 3. Such a peeler 1 may be able to adjust the curvature of the curved blade 8 with the adjustment means 9 for adjusting the peeling gap 7. This may effect adjustment of the adjustable peeling gap 7. Having both an adjustable peeling gap and a curved blade may provide benefits associated with both the adjustable peeling gap and the curved blade.

Figure 17:
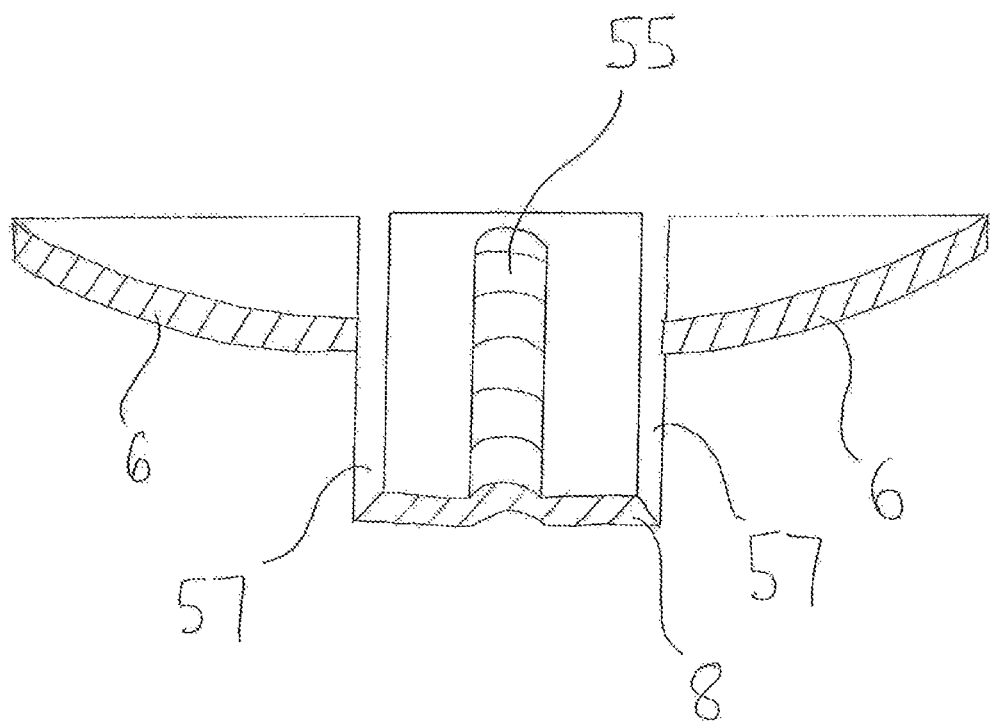
FIG. 17 illustrates a blade and a blade mount of a peeler, in lateral cross-sectional view.

A blade which is sufficiently flexible to permit bending of the blade in certain locations (e.g. in the radiused parts 33 labelled in FIGS. 1, 14 and 15) to adjust the width w of the peeling gap 7 may be susceptible to unwanted deformation or movement when pressure is applied to the blade (e.g.

during peeling). This may include, for example, torsional twisting of the blade. A blade 8 used in embodiments of the invention (whether it is a substantially curved blade as illustrated in FIGS. 15 and 16 or a substantially straight blade as illustrated in FIGS. 1 and 14) may therefore be provided with means for controlling and/or minimising deformation of the blade 8. For example, FIG. 17 illustrates in lateral cross-sectional view a blade mount 6 and a blade 8 used in a peeler 1 according to an embodiment of the invention. The illustrated view looks along the length of the blade 8 from a section approximately at or near the axial midpoint of the blade 8.

The illustrated blade 8 includes a rib 55 extending at least part way along the axial length of the blade 8. The rib 55 strengthens the blade 8. The rib 55 helps to minimise torsional twisting of the blade 8. In the illustrated embodiment, the rib 55 is positioned centrally in the width of the blade 8, but in other embodiments it may be positioned differently. The rib 55 or other stiffening means may be included as part of the forming process of the blade 8. Alternatively or additionally, stiffening means (e.g. a stiffening structure) may be applied to an already formed blade to help resist unwanted deformation of the blade. In blades 8 that are curved along a substantial portion of their length (such as the blades 8 illustrated in FIGS. 15 and 16), the rib 55 or other stiffening means may additionally help to maintain the curvature of the blade 8 when pressure is applied to the blade 8 (e.g. when a cutting edge 57 is brought into contact with an object to be peeled and a force is applied to the object via the peeler 1 to peel the object).

Figure 18:
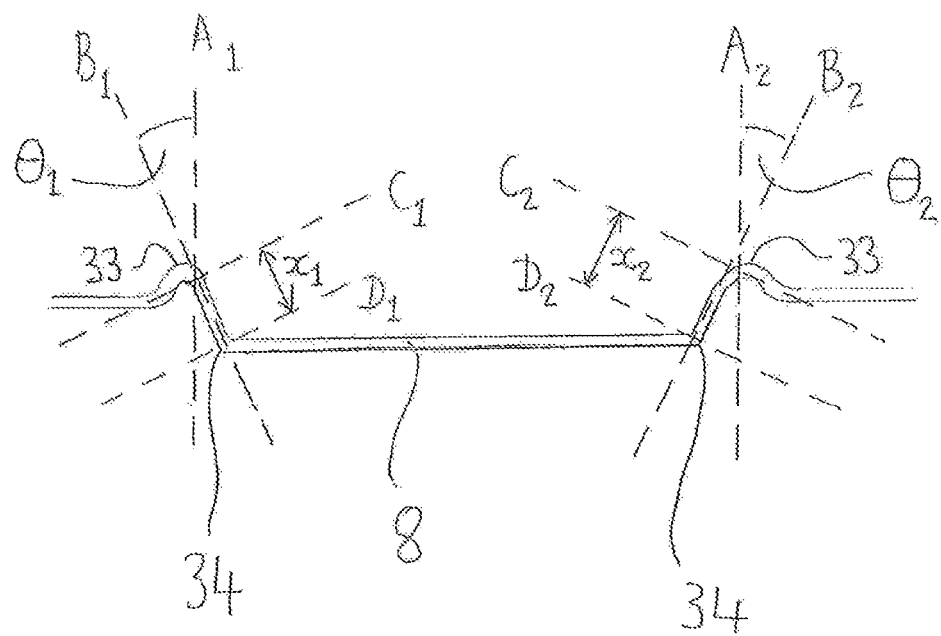
FIG. 18 illustrates a blade of a peeler, in axial cross section.

FIG. 18 illustrates aspects of the geometry of an example blade 8 used in an embodiment of the invention. The illustrated blade 8 includes two radiused corners 33 at which the material forming the blade 8 is curved to change the direction of projection of the blade 8. The curved corners 33 may permit the blade 8 to flex or extend in the vicinity of the curved corners 33 and thereby adjust the peeling gap 7. The curved corners 33 may help to minimise damage caused to the blade 8 by repeated adjustment of the peeling gap 7. The curved corners 33 may flex or extend in preference to other parts of the blade 8, to help ensure maintenance of a peeling gap 7 which is approximately uniform in width w along a substantial part of its length when the size of the peeling gap 7 is adjusted. The curved corners 33 may be the weakest parts of the blade 8.

The illustrated blade 8 also includes angular corners 34 and substantially straight sections $x_1$ and $x_2$ extending between corners 33 and 34. In the illustrated embodiment, the lengths of sections $x_1$ and $x_2$ of blade 8 are equal. The blade 8 is approximately symmetrical about its midpoint. This may help ensure that the adjustable peeling gap 7 remains a uniformly parallel gap 7 along its length when the gap 7 is adjusted using the adjustment means, rather than changing the angle between the central section of the blade 8 and the blade mount 6.

When the peeling gap 7 is adjusted, the angles $\theta_1$ and $\theta_2$ between the lines $A_1/A_2$, which extend approximately orthogonal to the longitudinal axis of the blade 8, and the lines $B_1/B_2$, which extend through the lengths $x_1$ and $x_2$, will be decreased if the width w of the peeling gap 7 is increased, and increased if the width w of the peeling gap 7 is decreased. In other words, the lengths $x_1$ and $x_2$ are angled to protrude a lesser or greater distance away from blade mount 6 when the tension in the blade 8 is varied, thus adjusting the width w of the peeling gap 7. Therefore, the lengths $x_1$ and $x_2$, combined with the parameters of the other elements of the adjustment means (such as the maximum rotation angle of the rotatable dial 11) determine the minimum and maximum width w of the adjustable peeling gap 7. In order to maintain the blade mount 6 and the blade 8 in an approximately parallel relation, the angular corners 34 may also permit a certain degree of flexing and extending.

The extent of flexing permitted by the radiused corners 33 may be limited such that the risk of the material(s) forming blade 8 cracking are minimised. The material(s) forming the blade 8 may be configured to withstand repeated flexion and extension. The material of the blade 8 in the vicinity of the radiused corners 33 may be different from the material at other parts of the blade 8, e.g. by having a different thickness from the material forming other parts of the blade 8 or being a different substance from the substance forming the other parts of the blade 8. One or more parts of the blade 8 may be made of high-carbon stainless steel.

Figure 19:
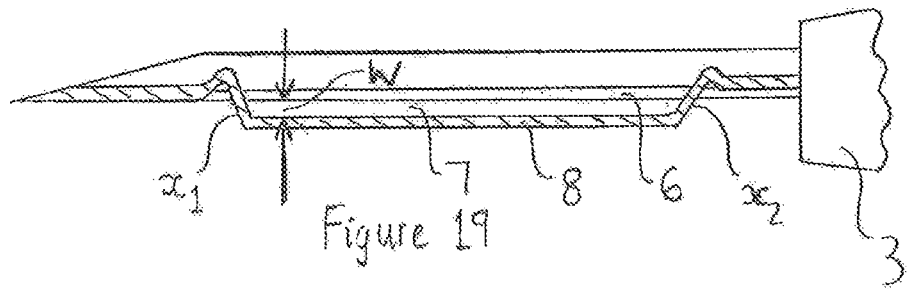
FIG. 19 illustrates a blade, a blade mount and part of a handle of a peeler, in axial cross section.
Figure 20:
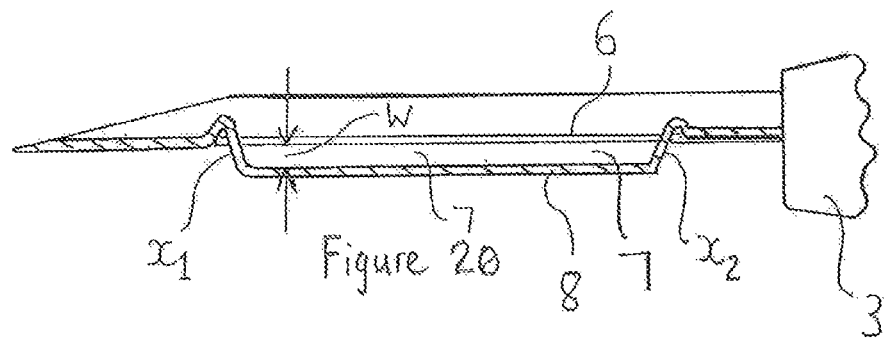
FIG. 20 illustrates a blade, a blade mount and part of a handle of a peeler, in axial cross section.

The change in the angles $\theta_1$ and $\theta_2$ is illustrated in FIGS. 19 and 20, which schematically show the arrangements of the respective lengths of the blade 8 when the peeling gap 7 is adjusted. In FIG. 20, the angles $\theta_1$ and $\theta_2$ are relatively small (such that the lengths $x_1$ and $x_2$ are closer to the lines $A_1$ and $A_2$ orthogonal to the longitudinal axis of the blade 8) and the peeling gap 7 is relatively wide, whereas in FIG. 19 the angles $\theta_1$ and $\theta_2$ are relatively large (such that the lengths $x_1$ and $x_2$ are closer to the longitudinal axis of the blade 8) and the peeling gap 7 is relatively narrow. In some preferred embodiments, $\theta_1$ and $\theta_2$ may be constrained such that they cannot be less than 20°. This may help ensure that tension in blade 8 is maintained at an adequate level for peeling objects.

Figure 20A:
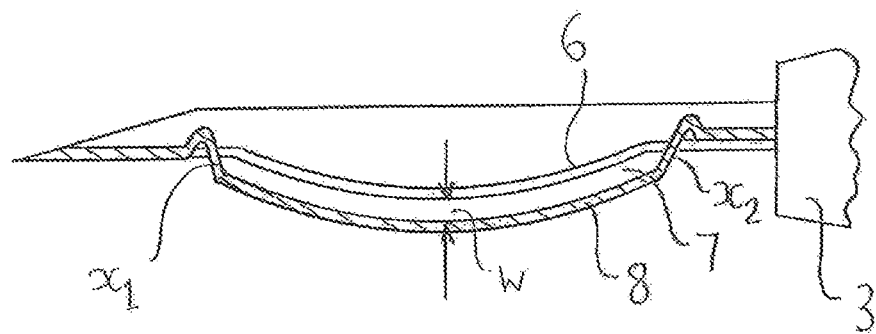
FIG. 20A illustrates a blade, a blade mount and part of a handle of a peeler, in axial cross section.
Figure 20B:
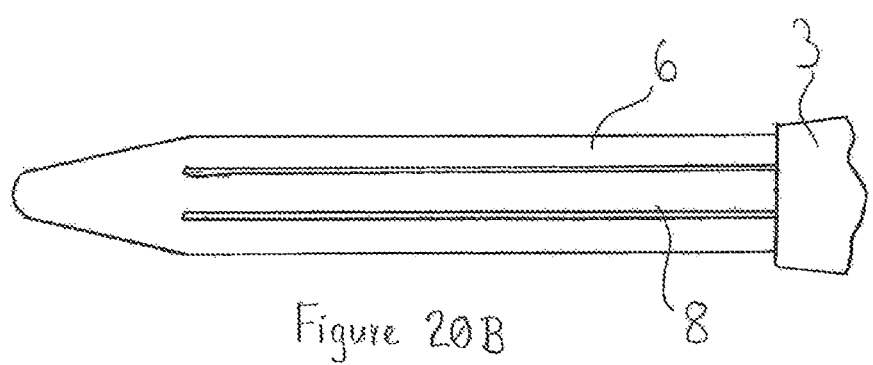
FIG. 20B illustrates a blade, a blade mount and part of a handle of a peeler, in plan view.

FIG. 20A illustrates an example of a curved blade 8. The same principles as described above in the contexts of FIGS. 18 to 20 apply to the curved-blade embodiment illustrated in FIG. 20A. FIG. 20B illustrates a blade 6, a blade mount 8 and part of a handle 3 of a peeler 1, in plan view.

Figure 21:
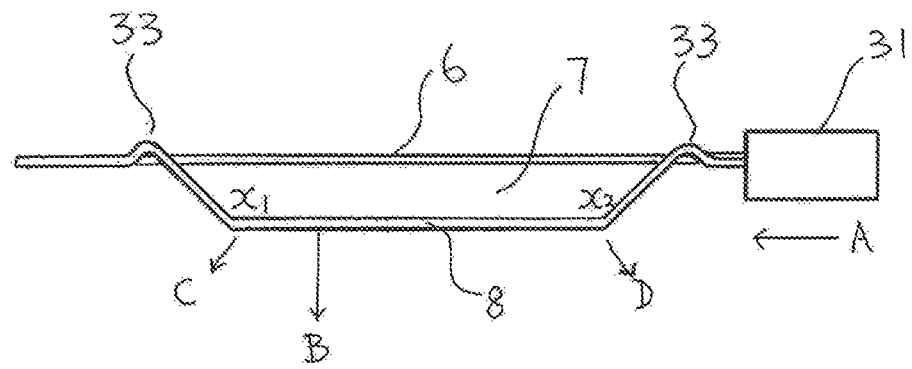
FIG. 21 illustrates a blade and a blade mount of a peeler, in axial cross section.
Figure 22:
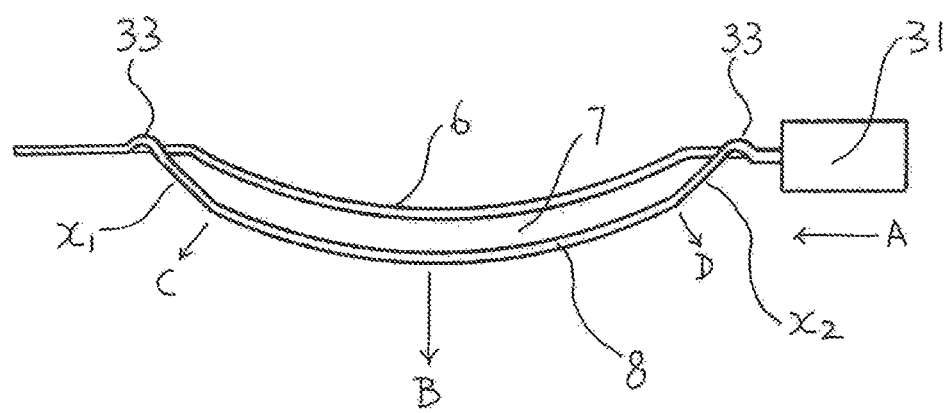
FIG. 22 illustrates a blade and a blade mount of a peeler, in axial cross section.

FIGS. 21 and 22 illustrate with arrows A, B, C and D how the different parts of the blade 8 and joint 31 move when the adjustable peeling gap 7 is increased, in embodiments with a straight blade 8 (FIG. 21) and a curved blade (FIG. 22). A user of the blade 8 rotates the adjustable dial 11 such that the connector 29 applies a force to the joint 31 in the direction indicated by arrow A. The joint 31 moves in the direction of arrow A, causing the blade 8 to flex at the curved corners 33 and the angular corners 34. The flexion causes the bottom end of length $x_1$ to move in the direction indicated by arrow C and the bottom end of length $x_2$ to move in the direction indicated by arrow D. The substantially straight or curved section of the blade 8 (in FIG. 21 or 22, respectively) is caused to move in the direction indicated by arrow B, i.e. downwards in the figures, away from the blade mount 6.

Figure 23:
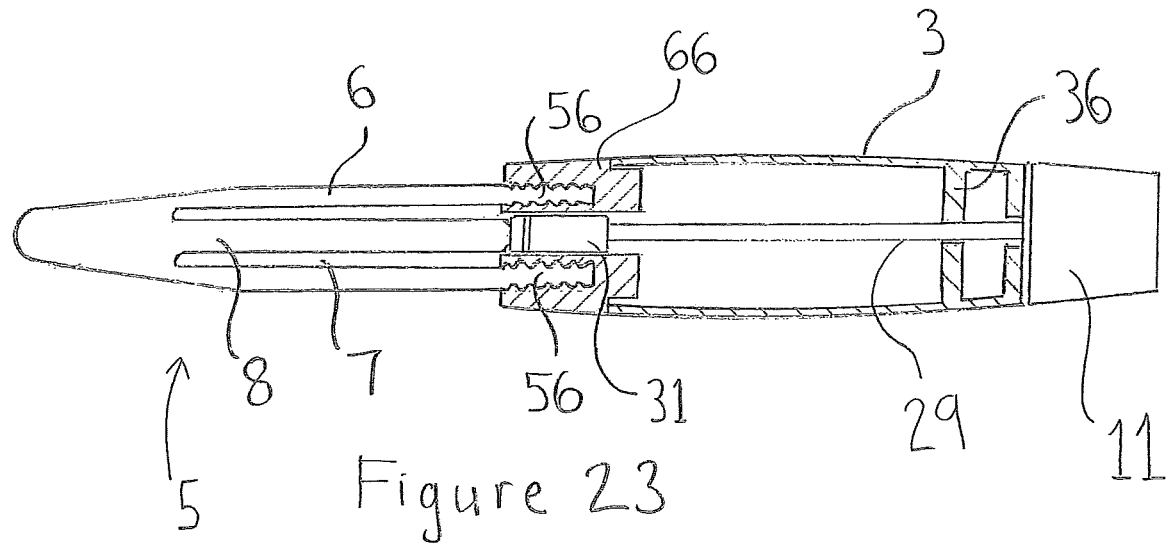
FIG. 23 illustrates a peeler in partial axial cross section and partial plan view.
Figure 24:
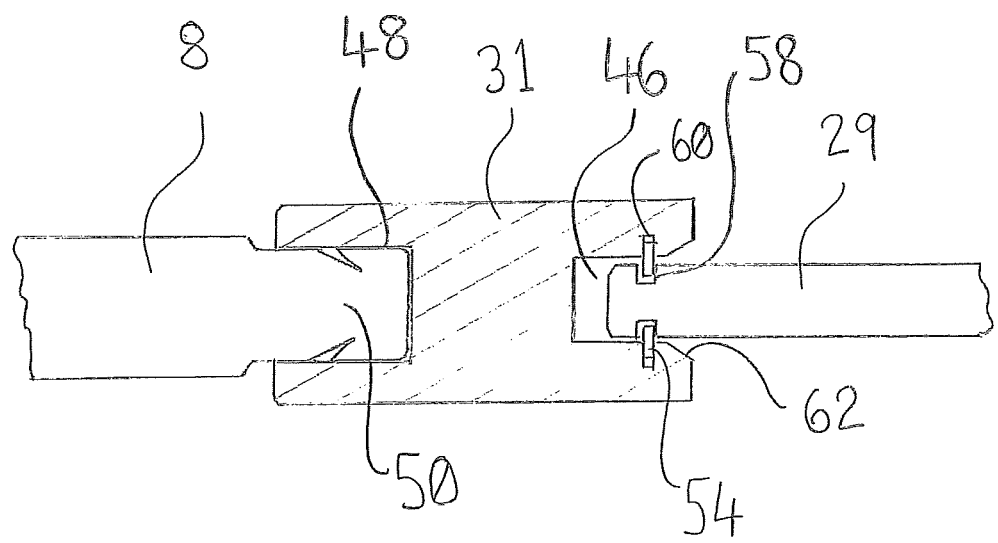
FIG. 24 illustrates parts of a peeler, in axial cross section.

FIG. 23 illustrates how peeling portion 5 is connected to handle 3 in the illustrated embodiment. Ends 56 of blade mount 6 occupy recesses 68 (labelled in FIG. 26) in a connecting portion 66. The connecting portion 66 may be a part of the handle 3 or may be provided as a separate portion which can be inserted into and connected, with suitable means, to handle 3. The illustrated ends 56 are serrated, which may help them remain within the recesses 68. Appropriate connecting means may also or alternatively be used to retain the ends 56 in the recesses 68 in the connecting portion 66. For example, in some embodiments, an adhesive such as a glue may be inserted into the recesses 68 in connecting portion 66 to hold the ends 56 of the blade mount 6 in place. As illustrated in FIG. 24, an end of blade 8 is inserted into a recess 48 in joint 31 and held in place with appropriate connecting means. In the illustrated example, the connecting means comprise a one-way barb 50 on the end of the blade 8, the one-way barb 50 being arranged to engage with the wall(s) of the recess 48 to connect the blade 8 and the joint 31 to one another. Other connecting means are also possible. Again, for example, an adhesive such as a glue may be used to hold the end of the blade 8 in place.

Connector 29 is inserted into a recess 46 in joint 31. Connector 29 and joint 31 are then connected using a circlip 54 which is slotted during assembly of the peeler 1 into a groove 58 in connector 29 and a groove 60 in joint 31 to hold the two components in place axially relative to each other. Illustrated joint 31 includes a countersunk end portion 62. This may facilitate insertion of circlip 54 and also accommodate variations in alignment between the joint 31 and the end of connector 29.

Figure 25:
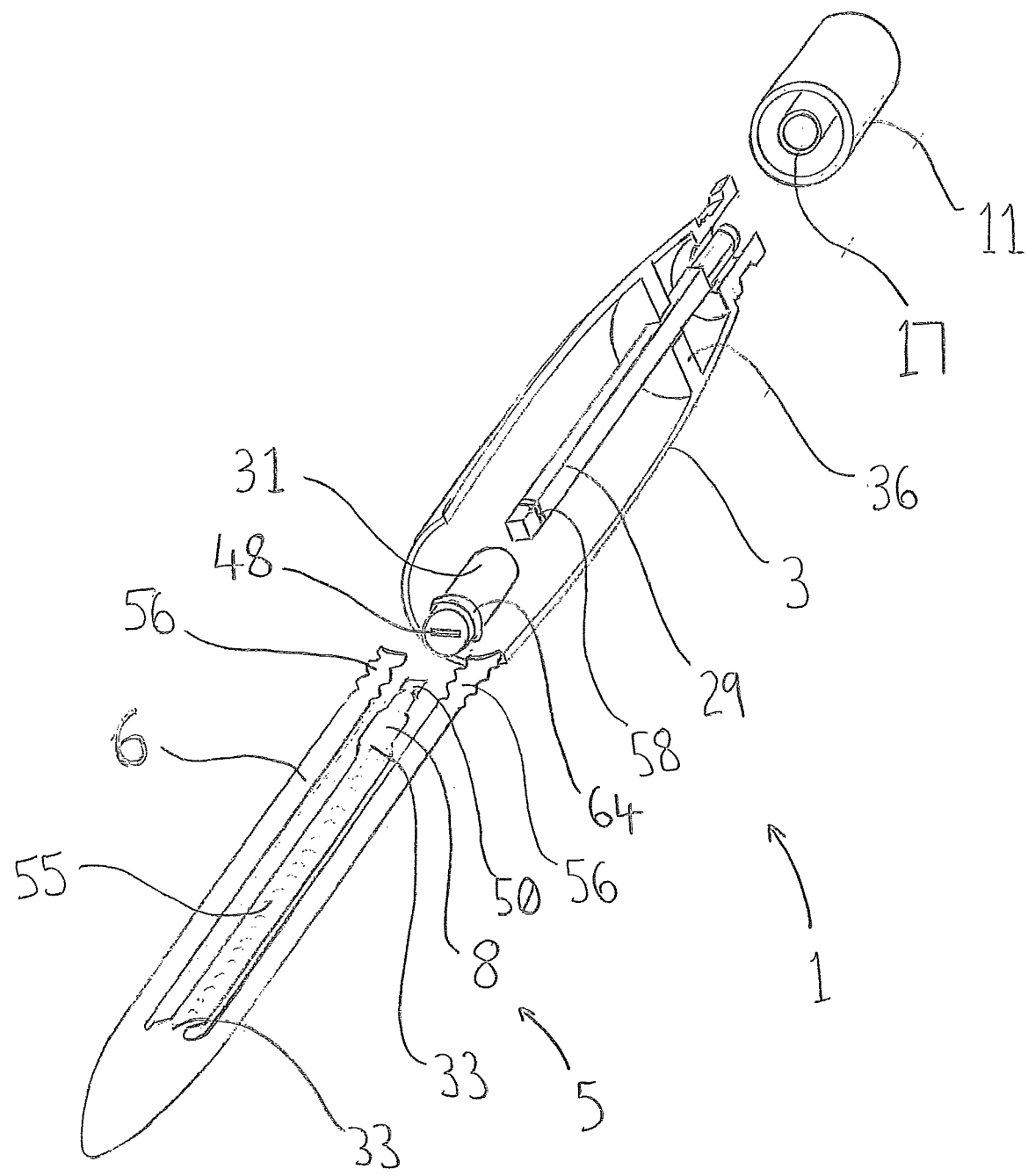
FIG. 25 illustrates parts of a peeler, in partial cross sectional plan view and partial perspective view.

In the illustrated embodiment, joint 31 is provided with a seal 64 (see FIG. 25). Seal 64 serves to prevent ingress of substances into the handle 3 of the peeler 1 around the outside of the joint 31, between the joint 31 and the connecting portion 66, into which the joint 31 is inserted during assembly of the peeler 1. Seal 64 may be made of any appropriate material, such as a rubber.

As illustrated in FIGS. 24 and 25, a retaining member 36 is provided within handle 3. Retaining member 36 serves to constrain or prevent rotation of connector 29 about the longitudinal axis of the peeler 1. Therefore, when rotatable dial 11 is rotated causing inner sleeve 17 to rotate (by virtue of the arrangement illustrated in FIG. 4 and described above), the connector 29, which is connected to inner sleeve 17 at 39, is caused to translate linearly rather than to rotate, because it is constrained by retaining member 36. In the illustrated example, connector 29 is square in cross section, and retaining member 36 has a square aperture through which connector 29 passes.

Figure 26:
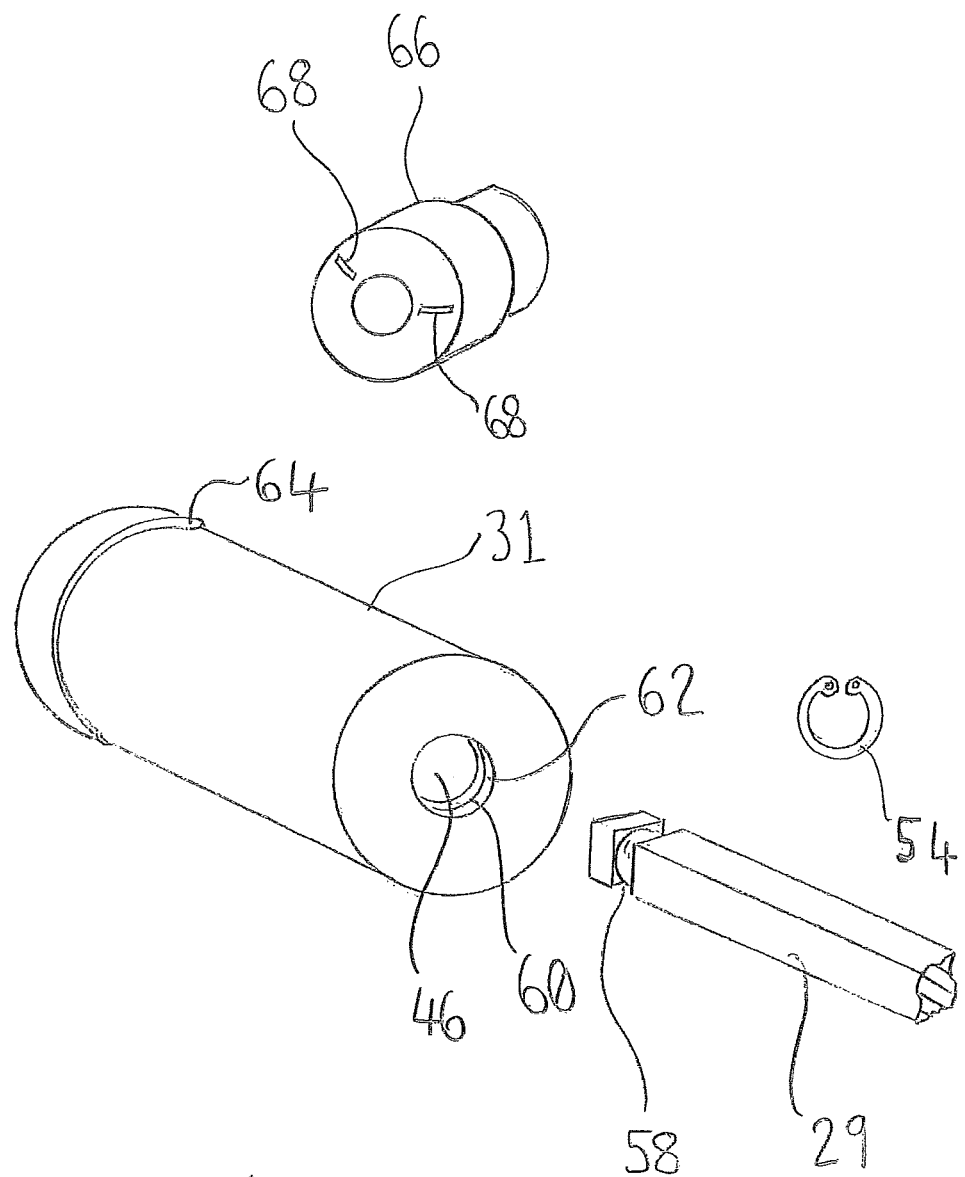
FIG. 26 illustrates part of a peeler, in perspective and plan views.

FIG. 25 shows the components of a peeler 1 according to an embodiment of the invention, giving an overview of how the different components are to be assembled to form the peeler 1. FIG. 26 shows in more detail the connector 29, the joint 31, the circlip 54 and the connecting portion 66.

Although in the above embodiments the primary focus was on adjusting the width w of the adjustable peeling gap 7, to control the thickness of the outer layer (peel) removed from an object, in other embodiments the primary desire may be to adjust one or more other dimensions, parameters or characteristics of the peeling gap 7, such as the length (i.e. the dimension of the peeling gap 7 approximately parallel to the longitudinal axis of the peeler 1 in FIG. 1, 2 or 3 or orthogonal thereto in FIG. 14) or the curvature, as discussed above. Adjustment of the length may advantageously allow the user to adjust the peeler 1 for use with objects with particular dimensions (e.g. unusual broadness or narrowness).

In some embodiments, adjustment of one dimension, parameter or characteristic may lead to adjustment of one or more other dimensions, parameters or characteristics. For example, adjustment of the width w of the peeling gap 7 illustrated in FIG. 1 may lead to some lengthening or shortening of the length of the peeling gap 7 (i.e. the dimension of the peeling gap 7 measured substantially parallel to the longitudinal axis of the peeler 1 in FIG. 1, orthogonal to the width w).

In the above embodiments the peeling gap 7 is formed between the blade 8 and what is described as a "blade mount" 6. The blade mount 6 could be a separate component from the handle 3 which is connected—by insertion or otherwise—to the handle 3, or could be part of the handle 3—the blade mount 6 need not be a separate component from the handle 3. Therefore the blade mount 6 need not be construed as a separate component from the handle 3 in the context of this document. In some embodiments, the blade mount 6 and the blade 8 may be formed in one process, from the same piece of material. They may for example be stamped or pressed from a single sheet of material, and then connected to the handle 3 via a connecting portion 66 or otherwise.

Although in the above description the focus is on a change of configuration of the blade 8 that leads to adjustment of the peeling gap 7, the blade mount 6 may additionally or alternatively change configuration to achieve adjustment of the peeling gap 7. For example, in some embodiments, rotation of the rotatable dial 11 may cause a change in configuration of both the blade mount 6 and the blade 8.

Although the illustrated embodiments include radiused parts 33 in the blade 8, such parts may be omitted in other embodiments. Alternatively, in some examples, one or more of the angular corners 34 may be replaced with curved corners 33. For example, in some embodiments, the two angular corners 34 illustrated in FIG. 18 may be replaced by curved corners 33, such that there are four curved corners 33 in total.

Although in the illustrated example a joint 31 is described as potentially providing some angular tolerance for the blade 8 and/or the connector 29 such that the longitudinal axes of the blade 8 and the connector 29 can be out of alignment with one another and/or so that the angle between the blade 8 and the connector 29 can vary, a simpler joint may be provided, e.g. in the form of fixing means directly or indirectly connecting the blade 8 and the connector 29 (e.g. glue, tape or other adhesive means). As described above, tensioning or positioning elements could be included inside the handle 3 of the peeler 1 to try to accommodate any changes in angle between the blade 8 and the connector 29 that are required.

Although in the above embodiments the adjustable dial 11 and accompanying components of the adjustment means 9 are provided at the opposite end of the peeler 1 from the peeling portion 5, they need not (or need not all) be at or towards the end of the peeler 1. For example, the adjustable dial 11 may be provided part way along the handle 3. However, it may be ergonomically preferable for the rotatable dial 11 to be provided at the end of the peeler 1, to minimise risk of inadvertent rotation of the dial 11 while the peeler 1 is being used to peel an object.

Figure 27:
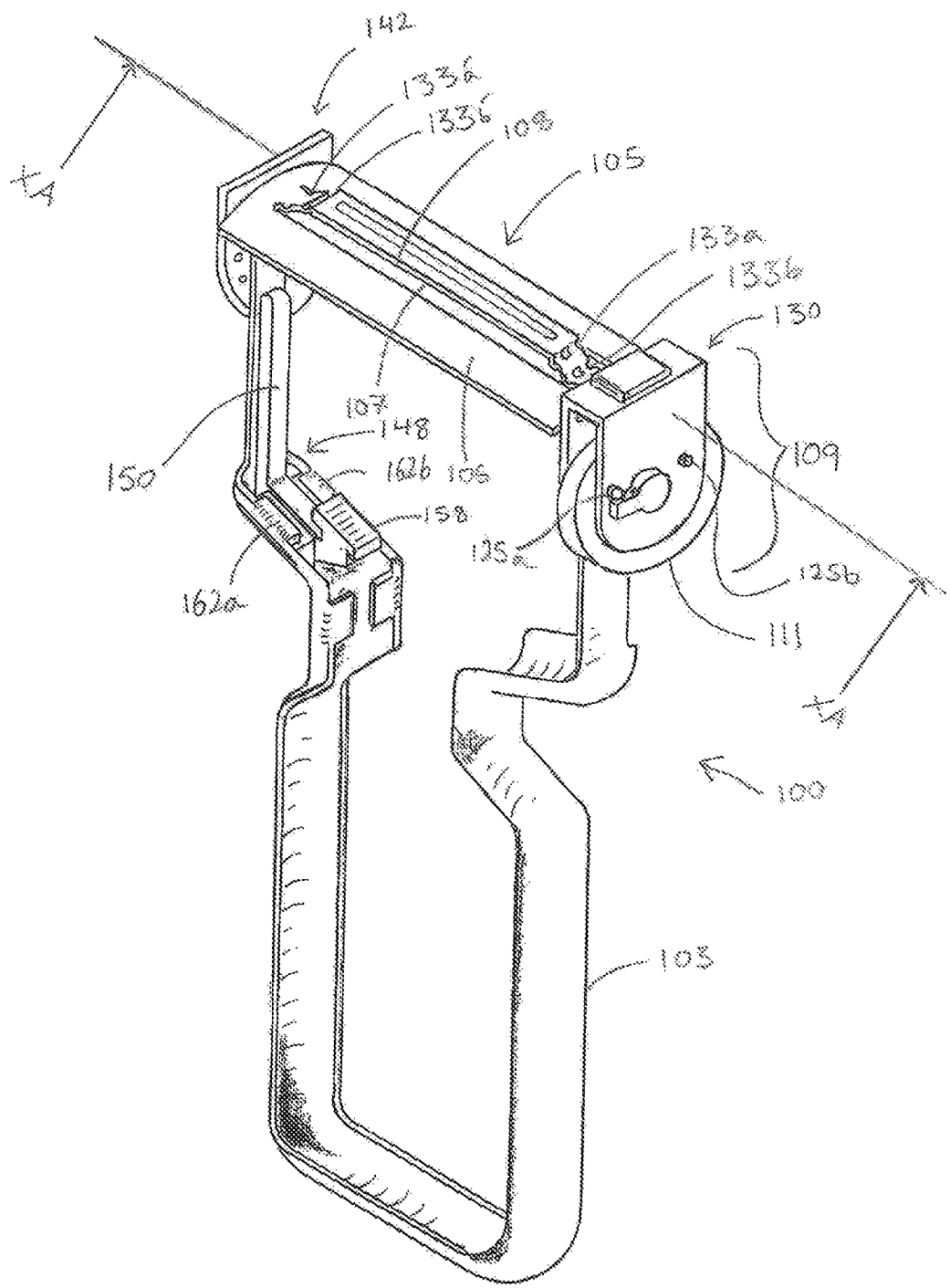

FIGS. 27-53 show alternative arrangements of a "Y" shaped peeler 100 with an adjustable peeling gap 107. This is a similar arrangement to that of the "Y" shaped peeler 1 of FIG. 14 but differs in that the adjustment means 109 of the peeler 100 is mounted proximate to the peeling portion 105 and comprises a different mechanism to achieve adjustment of the peeling gap 107. As before, the blade mount 106 and blade 108 define the peeling gap 107 and the peeling portion 105, together with the adjustment means 109, are mounted onto the handle 103, as illustrated by FIG. 27.

Figure 28:
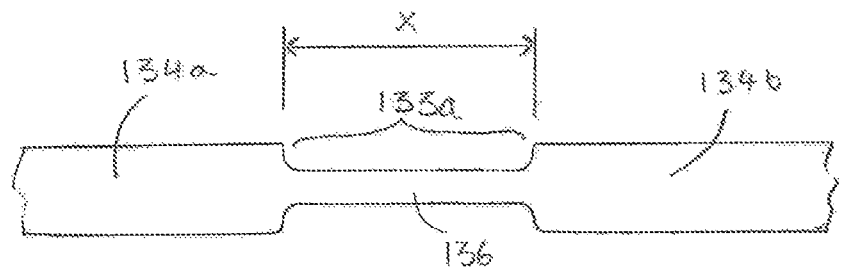
Figure 29:
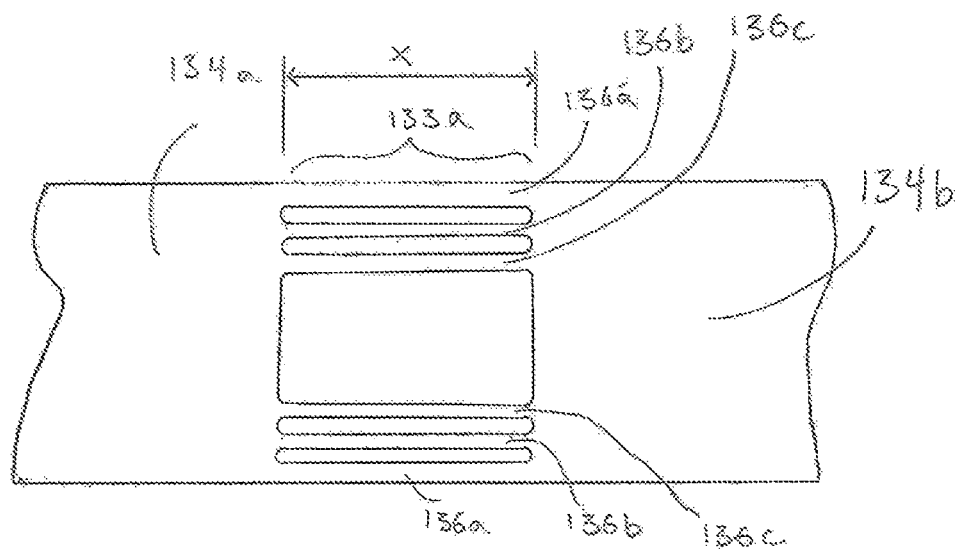
Figure 30:
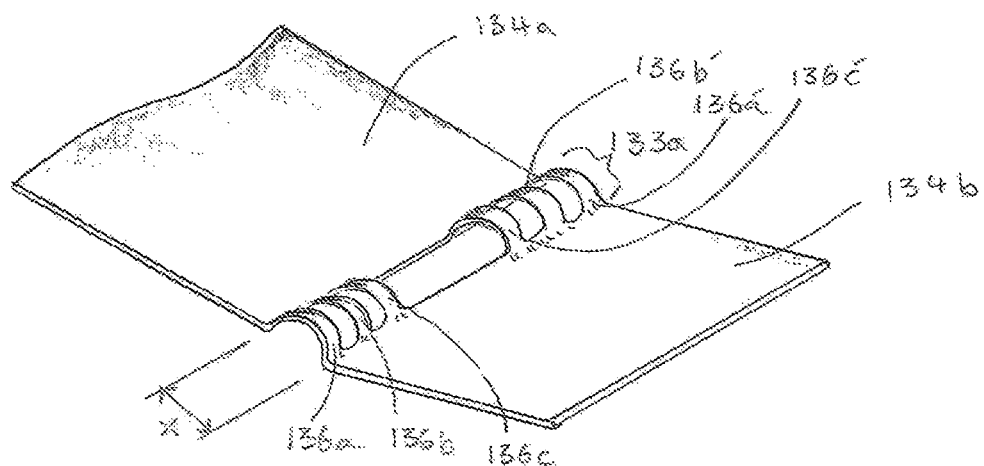

In this embodiment, the blade 108 comprises a plurality of radiused parts (133*a*, 133*b*, 133*a'*, 133*b'*) at either end of the blade 108, although some embodiments may have one radiused part at either end of the blade 108. FIGS. 28-30 show an enlarged view of the radiused parts of FIG. 27, with FIG. 28 showing a side view wherein area 136 of reduced cross-section/thickness of the material before forming of the micro-radii can be seen. The reduction in thickness by means of forging will add to the strength of the radius and improve reliability. FIGS. 29 and 30 detail an embodiment with a radiused part 133*a* comprising a plurality of micro-radii 136*a*, 136*b*, 136*c*, 136*a'*, 136*b'*, 136*c'*. Here, the micro-radii 136a, 136b, 136c, 136a', 136b', 136c' can be formed by machining the 'cut-outs' seen in-between the micro-radii; this helps to reduce the mechanical resistance of the material in segment 'X' of FIGS. 28-30 to allow for easier mechanical manipulation of the material into its intended final geometry.

FIGS. 28-30 illustrate how the radiused part or parts 133a, 133b, 133a', 133b' form a 'hinge' between the connecting portions 134a,134b. Here, the connecting portions (134a, 134b) may connect to an additional radiused part, see FIG. 37, or directly to the blade 108. In the embodiment illustrated by FIG. 30, the connecting portion 134a connects to an additional radiused part 134a and the connecting portion 134b connects directly to the blade driver 110. For FIGS. 28-30, the width 'X' illustrates the length across the entire radiused part before it is curved to form a semi-circle like 'hinge'.

FIGS. 31 and 32 show the peeling portion 105 prior to shaping and integration with the peeler 100. FIGS. 33 and 34 are sideviews of the peeling portion 105, in embodiments with a straight blade 108 (FIG. 33) and a curved blade 108 (FIG. 34), after the peeling portion 105 has been shaped into a final geometry and is ready to be integrated with the peeler 100.

FIGS. 35 and 36 give an end view of the peeling portion 105, as seen looking into the blade driver 110 (towards arrows 'A' in FIGS. 33 and 34) in embodiments with a straight blade 108 and a curved blade 108 respectively, showing the strengthening rib 155 on the blade 108.

Figure 38:
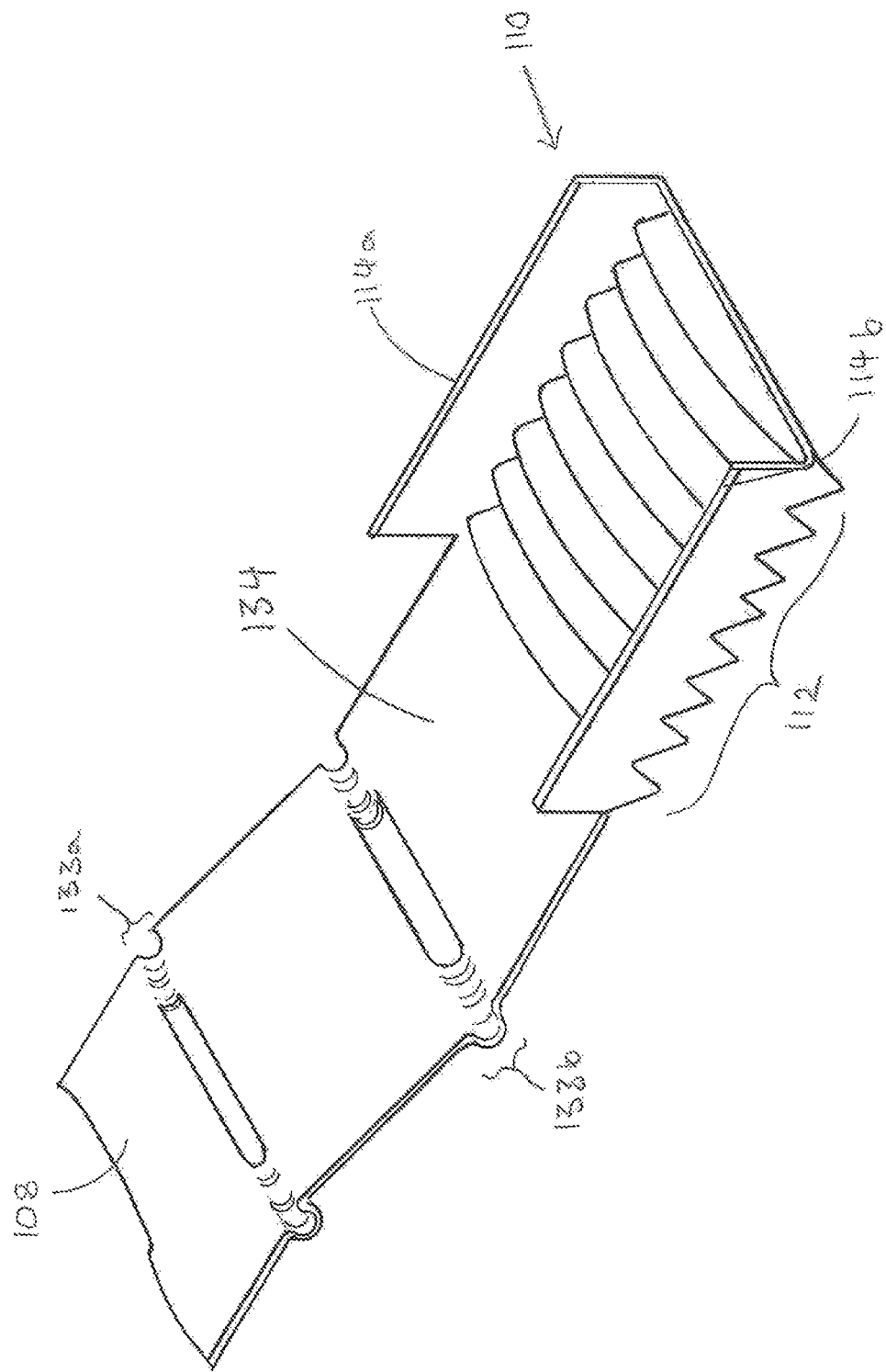

The radiused parts (133a', 133b') on the left-hand end of FIG. 27 connect the blade 108 to the blade mount 106 and the radiused parts 133a, 133b on the right-hand end connect the blade 108 to the blade driver 110 (seen in detail by FIG. 38). The blade driver 110 comprises a 'toothed' underside, referred to as threading teeth 112, and upright abutting sidewalls 114a,114b, the function of which will now be explained in conjunction with the adjustment means 109.

Figure 39:
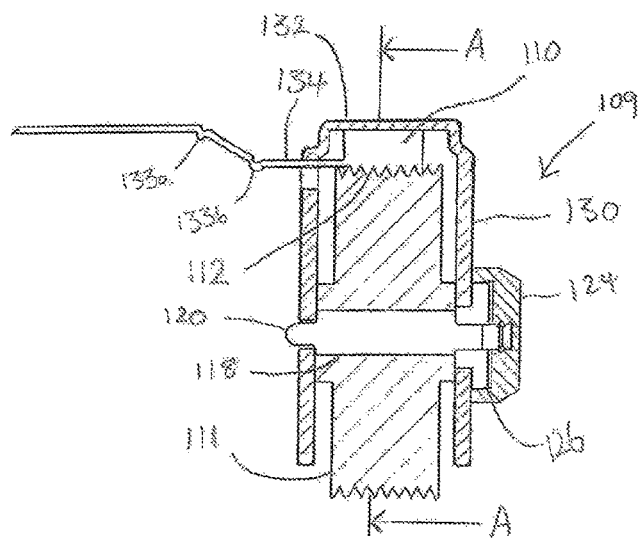
Figure 40:
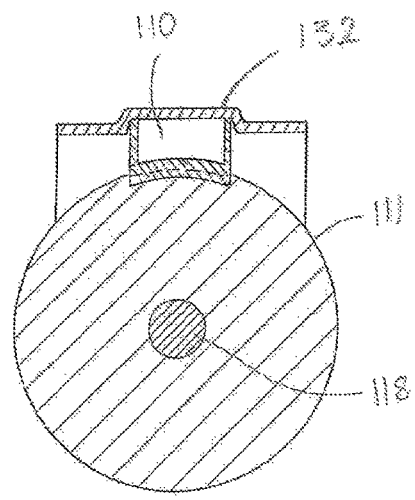
Figure 41:
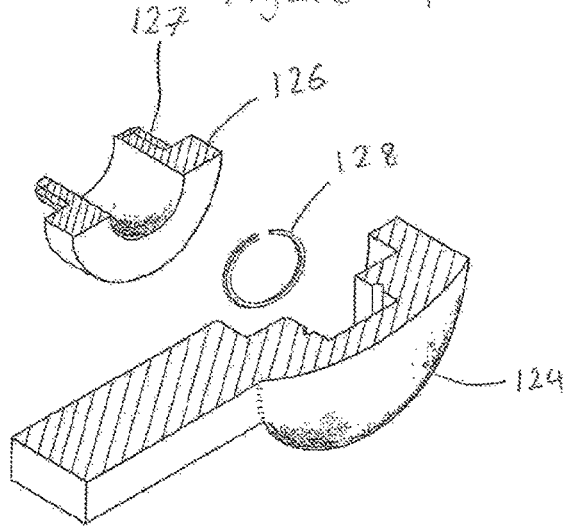

FIG. 39 illustrates a cross-sectional view of the peeler 100 along a plane XA of FIG. 27 showing the adjustment means 109 in detail. As before, the adjustment means 109 are used to adjust the width of the peeling gap 107 by tensioning the blade 108. The adjustment means comprise a rotatable dial 111 provided proximate to the peeling portion 105. The dial 111 is threaded and may mesh with the blade driver 110 via the threading teeth 112 of the driver 110. The dial 111 is also rotatable, by a user, about a longitudinal axis of the peeling portion 105 and the rotatable motion of the dial 111 is converted into linear motion of the blade driver 110 allowing the transfer of rotational motion, by a user, of the dial 111 to linear motion of the driver 110. The linear position of the blade driver 110 affects the tension in the blade 108 of the peeling portion 105.

Using the rotatable dial 111, a user is able to adjust the peeling gap 107 of the peeler 100 by controlling the amount of tension in the blade 108 via the blade driver 110. Linear adjustment of the blade driver 110, via the rotatable dial 111, correspondingly adjusts the tension of the blade 108. As previously described for the adjustment means 9 of the peeler 1 in FIG. 1, with the blade driver 110 in a position proximate to the peeling portion 105, i.e. to the left-hand side of FIG. 39, the blade 108 may be in a first position with a wide peeling gap 107. As the blade driver 110 moves away from the peeling portion 105, i.e. to the right-hand side of FIG. 39, the tension exerted on the blade 108 is increased, drawing the blade 108 towards the blade mount 106 'straightening' the blade 108, decreasing the width of the peeling gap 107. In this way, a user can directly control and adjust the tension in the blade 108 to adjust the peeling gap 107 of the peeler 100. In other embodiments, a straightened blade may be the first position of the blade 108 and decreasing the tension exerted on the blade 108 would cause the blade 108 to flex, increasing the width of the peeling gap 107.

As previously described for the peeler 1 of FIG. 1, the radiused parts 133a, 133b, 133a', 133b' may help facilitate or encourage a drawing of the blade 108 towards the blade mount 106 when the tension in the blade is increased. The micro-radii 136a, 136b, 136c, 136a', 136b', 136c' may further help permit easier movement of the blade 108 by reducing the tension required to cause movement of the blade 108. In this way, the micro-radii 136a, 136b, 136c, 136a', 136b', 136c' may decrease the possibility of breakage of the blade 108 improving reliability of the peeler 100.

FIGS. 40-43 illustrate the mechanism which allows the rotatable dial 111 to be locked against rotation once a desired width of the peeling gap 107 is obtained, and then unlocked when a new width of the peeling gap 107 is desired. The dial 111 and driver 110 are both housed within a housing 130 and an adjustment lever 124 is mounted to the outside of the housing 130. The adjustment lever 124 allows a user to lock/unlock the rotatable dial 111 by moving the lever 124 from a locked position, to an unlocked position. The locked position and unlocked position are physically restricted by protrusions (125a, 125b), which act as stops to restrict the movement of the lever 124 between the locked/unlocked positions. The lever 124 is shown in the locked position in FIG. 42 and the lever 124 is rotatable 180 degrees anticlockwise from the locked position to reach the unlocked position.

With the lever 124 in the unlocked position, adjacent protrusion 125b, a user is able to rotate the dial 111 to adjust the width of the peeling gap 107 of the peeler 100 by adjusting the tension of the blade 108. With the lever 124 in the locked position, adjacent protrusion 125a, a user is unable to rotate the dial 111 to adjust the width of the peeling gap 107. In this way, a user can unlock the dial 111 using the lever 124 to adjust the width of the peeling gap 107 to a desired width and subsequently lock the dial 111 such that the desired set width of the peeling gap 107 is maintained and the user can operate the peeler 100 without the peeling gap 107 being inadvertently adjusted, i.e. a user is able to maintain the tension of the blade 108 after adjustment of the peeling gap 107.

Figure 43:
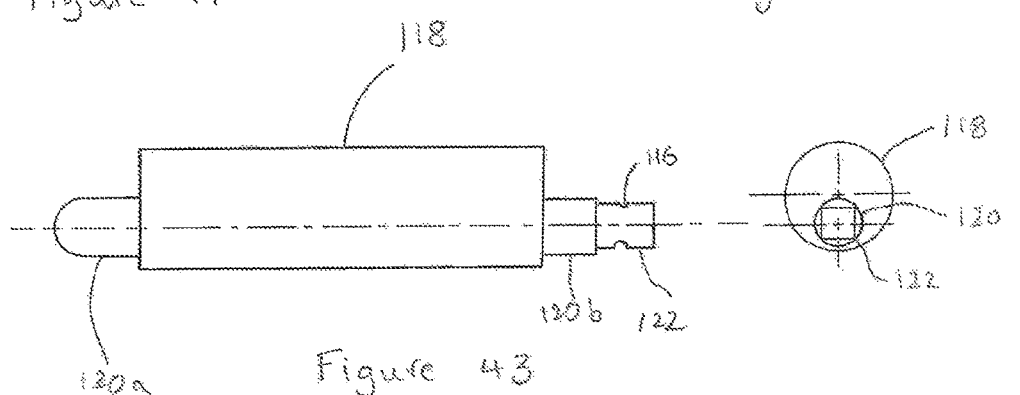
Figure 44:
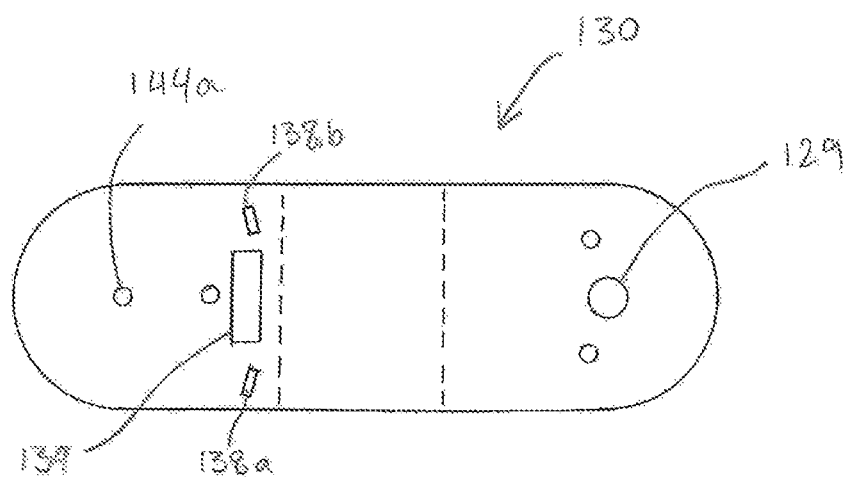
Figure 45:
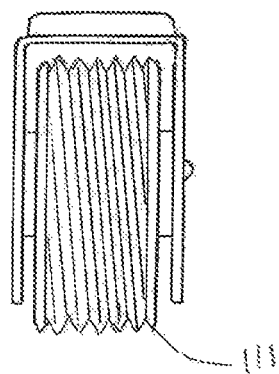
Figure 46:
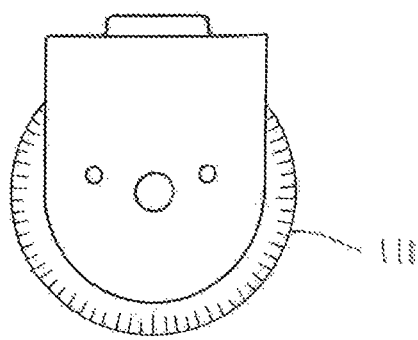

The adjustment lever 124 is able to lock/unlock the rotating dial 111 by way of a locking cam 118. The locking cam 118 passes, longitudinally, through the centre of the dial 111. Referring to FIG. 43, the locking cam 118 further comprises a centre pin 120 and a square pin 122, whereby the centre pin 120 and square pin 122 pass longitudinally through, and are affixed to, the locking cam 118 and centre pin 120 respectively. The locking cam 118, centre pin 120, and square pin 122 may be formed separately and rigidly fixed together or may be formed integrally into a single unit. The locking cam 118 is coupled to the lever 124 using the square pin 122, which protrudes from the end of the centre pin 120b and comprises a circumferential recess 116 to mechanically affix the lever 124 to the square pin 122 using the clip 128. In this way, turning the lever 124 from the locked position to the unlocked position will cause the square pin 122 to rotate anticlockwise at a rate commensurate with the turning of the lever 124. A locking ring 126 is mounted around the centre pin 120b proximate to the square pin 122 and comprises a threaded neck 127 which meshes with the threaded aperture 129 of the housing 130 (see FIG. 44) offering structural stability to the lever 124 and square pin 122 so as to minimise inadvertent axial loading of the pin 122 by the lever 124 during the turning of said lever 124 by a user between the locked/unlocked positions. The locking ring 126 is firmly affixed to the housing 130, via the described threading, and there is a small clearance between the lever 124 and ring 126 such that the ring 126 does not rotate with the lever 124, i.e. the lever 124 rotates independently of the ring 126.

FIG. 43 illustrates the locking cam 118 as being eccentric such that the centre pin 120, and square pin 122, do not pass centrally through the cam 118. In this way, starting with the lever 124 in the locked position, the cam 118 positions the rotatable dial 111 such that the dial 111 makes firm contact with the blade driver 110 forcing the abutting walls 114 (see FIG. 38) of the driver 110 into the upper housing portion 132 of the housing 130. In this position, the blade driver 110 is affixed firmly in place such the same amount of tension is maintained in the blade 108 while in use, i.e. the peeling gap 107 of the peeler 100 cannot be inadvertently adjusted.

Figure 42:
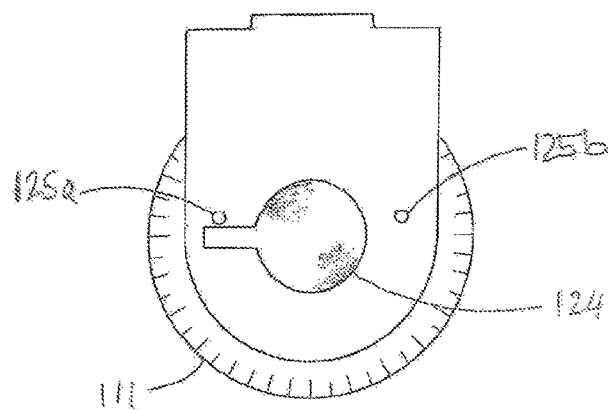

When the user desires to adjust the tension in the blade 108, i.e. to adjust the peeling gap 107, the adjustment lever 124 is rotated from the locked position as shown in FIG. 42, to the unlocked position, as previously described. As the lever 124 begins to rotate, the square pin 122 is also rotated about its centre axis causing the centre pin 120, and hence the locking cam 118, to rotate. The cam 118 is rotated 180 degrees anticlockwise with respect to the centre axis of the square pin 122 causing the dial 111 to move downwardly, relative to the upper housing portion 132, such that the abutting walls 114 are no longer in firm contact with the housing portion 132. The user can now freely adjust the peeling gap 107 by adjusting the tension in the blade 108 using the rotatable dial 111 and subsequently rotate the lever 124 back to the locked position to maintain the newly adjusted peeling gap 107 width as previously described. In this way, using the adjustment means 109, a 'fixed' tension of the blade 108 can be achieved and maintained by a user such that the width of the peeling gap 107 can also be maintained for subsequent use.

FIGS. 44-47 illustrate the structure of the housing 130 and the end plate 142. The housing 130 and end plate 142 have mounting recesses 138a, 138b, 138c, 138d which are machined such that the housing 130 and end plate 142 can be mounted to complementary mounting portions 140a, 140b (see FIG. 31) of the blade mount 106. In some embodiments, the mounting portions 140a, 140b may be resistance welded to the mounting recesses 138a, 138b, 138c, 138d. In preferred embodiments, a more efficient method would be to circumferentially apply pressure to the mounting recesses 138a, 138b, 138c, 138d such that they become 'crimped' to the mounting portions 140a, 140b securing them in place. The blade driver 110 is able to pass through the housing 130 via the blade recess 139. Using the fastening holes 144a, 144b, the handle 103 can then be mounted to the housing 130 and end plate 142 via the handle pins 146 (see FIG. 49) to form the peeler 100. In some embodiments, the blade 108 and blade driver 110 may be separate parts affixed together using an appropriate affixing means, for example an adhesive etc. In an preferred embodiment, the blade 108, blade mount 106, radiused parts 133a, 133b, 133a', 133b' and blade driver are all manufactured from a single piece of material, for example steel or porcelain.

Referring to FIGS. 48-53, the peeler 100 is able to accommodate various peeling angles using the swivel means 148. The swivel means 148 comprises a swivel body 150 that is affixed to a swivel mounting portion 152 (FIG. 53) using a mounting pin 154 and swivel spring 156. The mounting pin 154 allows the swivel body 150 to pivot about the pin axis when a sufficient downwards force is applied to an adjusting portion 158, of the swivel body 150, in the direction illustrated by FIG. 51 by arrow B. The mounting spring 156 ensures that the swivel body 150 is returned to a neutral position once a downwards force is removed from the adjusting portion 158.

The swivel means 148 is then mounted to the handle 103 of the peeler 100 using the clasping recesses 160a, 160b of the mounting portion 152. Here, the clasping members 162a, 162b of the handle 103 are clasped over the clasping recesses 160a, 160b securing the swivel means 148 in place.

Figure 47:
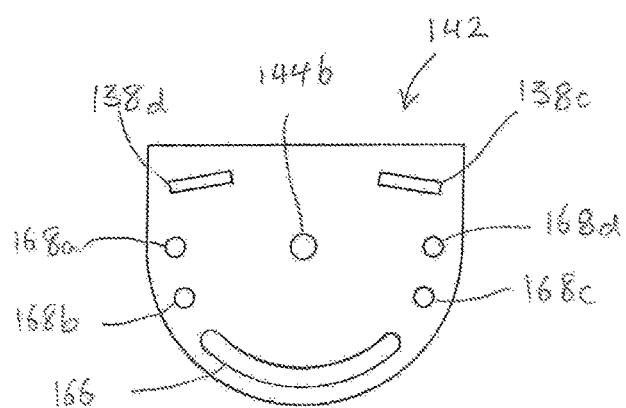
Figure 48:
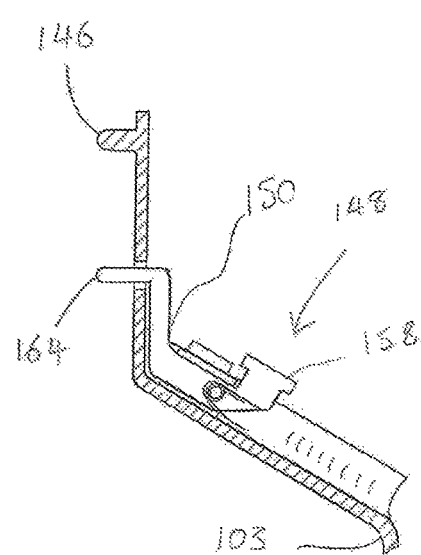
Figure 49:
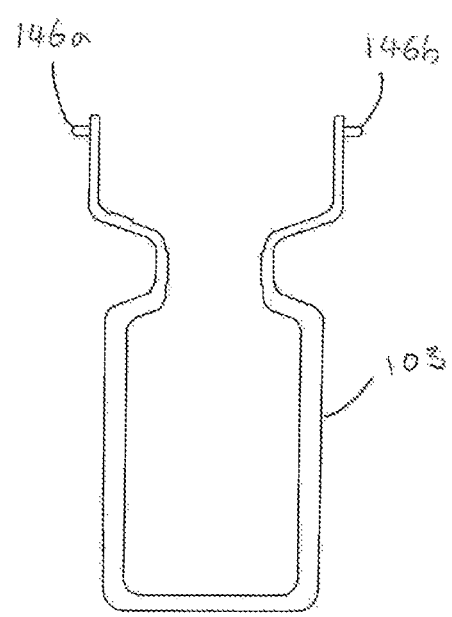
Figure 80:
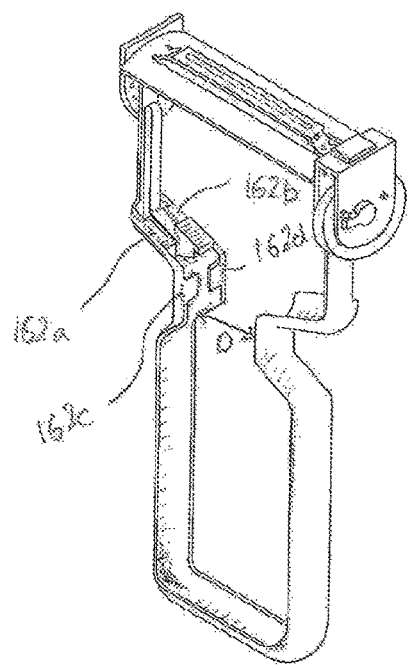
Figure 81:
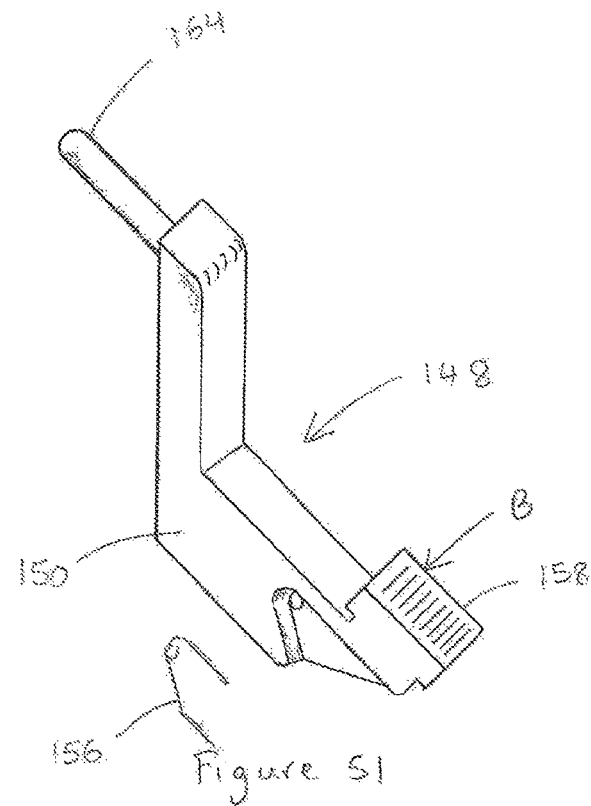
Figure 82:
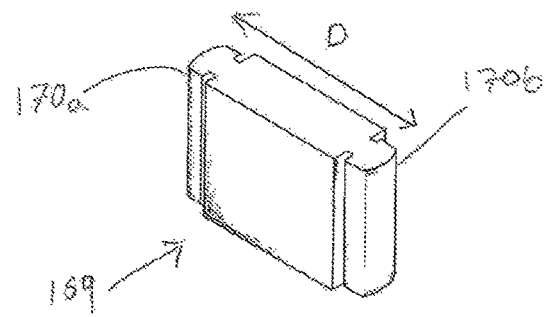
Figure 83:
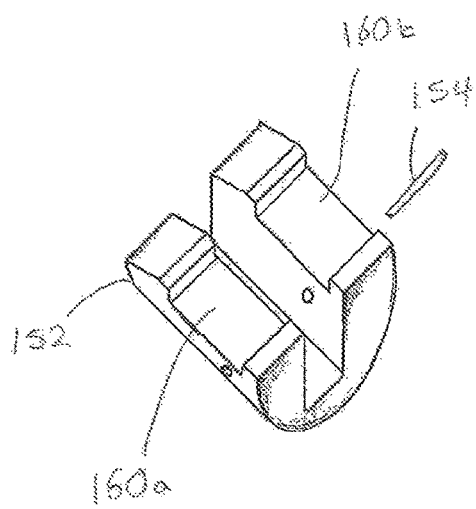

The swivel body 150 comprises a swivel pin 164 which passes through the handle 103 of the peeler 100 and subsequently connects to the end plate 142 via an arc shaped floating angle aperture 166 (FIG. 47). As the blade mount 106 is able to pivot about its longitudinal axis, via the handle pins 146, in use, the peeling portion 105 can adopt any peeling angle permitted by the movement of the swivel pin 164 within the arc of the floating angle aperture 166, allowing a user to utilise a variable cutting angle.

Alternatively, a fixed angle of the peeler 100 can be adopted by removing the swivel pin 164 from the floating angle aperture 166 and inserting the pin 164 into any of the fixed angle apertures 168a, 168b, 168c, 168d as required. To remove the swivel pin 164 from an aperture, a sufficient downwards force is placed upon the adjustment portion 158, as described above, such that the swivel body 150 pivots about the axis of the mounting pin 154, from a neutral position, retracting the swivel pin 164 from an aperture and biasing the mounting spring 156. The user can then 'swivel' the peeling portion 105 into a desired angle for peeling such that the swivel pin 164 becomes centrally aligned with one of the apertures 166a, 168b, 168c, 168d, 168. The downwards force placed upon the adjustment portion 158 can then be removed such that the biased spring 156 returns the swivel body 150 to its previous neutral position allowing the swivel pin 164 to pass through a now centrally aligned aperture 166a, 168b, 168c, 168d, 168, fixing the peeling portion 105 in place such that a fixed peeling angle is now adopted by the peeler 100. Accordingly, the fixed angle apertures 168a, 168b, 168c, 168d allow the peeler 100 to be used by both right handed users and left handed users (which may be useful for example, if one cutting edge of the blade is serrated).

FIG. 52 illustrates a supporting member 169 that can be affixed to the handle 103 of the peeler 100 using the clasping members 162c, 162d of the handle 103. Here, the sliding portions 170a, 170b of the supporting member 169 are 'slid' into the clasping members 162c, 162d of the handle 103 and the members 162c, 162d are depressed into the portions 170a, 170b holding the supporting member 169 in place. The clasping members corresponding to the sliding portion 170b are not shown by FIG. 50. The supporting member 169 provides structural stability to the peeler 100 by limiting mechanical deformation of the handle 103 when in use. A minimum separation distance D is maintained between both sides of the handle 103 when the supporting member 169 is mounted to the handle 103 such that the handle 103 of the peeler 100 cannot easily be inadvertently mechanically deformed. The supporting member 169 also helps to prevent the peeling portion 105 from inadvertently dethatching from the handle 103. The supporting 169 member may be made of a suitable material for this purpose, for example plastic and/or rubber. In other embodiments, a steel brace or wire may be fitted prior to assembly of the peeler 100 between the handle 103 arms and said arms may be manufactured thinner to allow a greater degree of flexion of the peeler 100.

The peeler 1, 100 and its components may be made of any suitable materials, such as plastics, metals or other components. In one embodiment, the handle 3, 103 and the rotatable dial 11, 111 may be made of plastic, and the blade mount 6, 106 and the blade 8, 108 may be made of metal. The internal components may be made of any appropriate materials.

As the skilled person will appreciate, the illustrated adjustment means 9, 109 is a suitable example of achieving an adjustable peeling gap 7, 107, but other means could provide the required functionality to achieve a peeler with an adjustable peeling gap. For example, it may be possible to achieve an adjustable peeling gap 7, 107 with a mechanism including a lever, a sliding rod or another suitable mechanism for initiating movement of the blade 8, 108 relative to the blade mount 6, 106.

In some embodiments, both the blade 8, 108 and the blade mount 6, 106 are caused to move by appropriate actuation of the adjustment means. For example, actuation of the adjustment means may cause simultaneous and complementary motion of the two parts (i.e. such that, viewed from externally, the blade mount 6, 106 moves towards the blade 8, 108 and the blade 8, 108 moves towards the blade mount 6, 106). In other embodiments, only one of the blade mount 6, 106 and the blade 8, 108 may be caused to move by actuation of the adjustment means.

In some embodiments, the blade mount 6, 106 may be arranged to move in the same direction as the blade 8, 108, but to a lesser extent, when the peeling gap 7, 107 is adjusted. For example, in embodiments incorporating a curved blade 8, 108, it may be necessary for the blade mount 6, 106 to move in the same direction as the blade 8, 108, but to a lesser extent, when the peeling gap 7, 107 is adjusted, in order for the peeling gap 7, 107 formed by the blade mount 6, 106 and the blade 8, 108 to be kept approximately uniformly parallel along the length of the peeling gap 7, 107.

In the accompanying drawings, some of the features of the illustrated embodiments have been exaggerated to illustrate aspects of the invention.

The invention claimed is:

1. A peeler comprising:
a handle, a blade mount, a blade and an adjustment device, the blade mount and the blade forming a peeling gap,
wherein the adjustment device is configured to adjust the tension of the blade in order to adjust the peeling gap, wherein the blade includes at least one radiused part arranged to facilitate adjustment of the peeling gap.

2. The peeler as claimed in claim 1, wherein the adjustment device is configured to allow a user to adjust the peeling gap to a predetermined value selected by the user and to maintain the peeling gap at said predetermined value during normal use.

3. The peeler as claimed in claim 1, wherein a width of the peeling gap is adjustable.

4. The peeler as claimed in claim 3, wherein the adjustment device includes a dial rotatable with respect to the handle to cause tensioning of the blade in order to adjust the peeling gap.

5. The peeler as claimed in claim 3, wherein the adjustment device includes mutually engaging members arranged to convert rotational motion of a first component of the adjustment device into linear motion of a second component of the adjustment device.

6. The peeler as claimed in claim 5, wherein the mutually engaging members are screw threads.

7. The peeler as claimed in claim 1, wherein the blade is moveable relative to the blade mount, via tensioning of the blade, to facilitate adjustment of the peeling gap.

8. The peeler as claimed in claim 1, wherein the at least one radiused part comprises a plurality of micro-radii arranged to further facilitate tensioning of the blade to adjust the peeling gap.

9. The peeler as claimed in claim 1, wherein the blade is curved along a portion of the length of the blade.

10. The peeler as claimed in claim 9, wherein the blade and the blade mount are curved.

11. The peeler as claimed in claim 9, wherein the blade is curved such that a cutting edge of the blade is curved.

12. The peeler as claimed in claim 2, wherein a width of the peeling gap is adjustable.

13. The peeler as claimed in claim 12, wherein the adjustment device includes a dial rotatable with respect to the handle to cause tensioning of the blade in order to adjust the peeling gap.

14. The peeler as claimed in claim 4, wherein the adjustment device includes mutually engaging members arranged to convert rotational motion of a first component of the tension adjuster into linear motion of a second component of the adjustment device.

15. The peeler as claimed in claim 14, wherein the mutually engaging members are screw threads.

16. The peeler as claimed in claim 9, wherein the blade curved such that a cutting edge of the blade is curved.

* * * * *